(12) United States Patent
Karafin et al.

(10) Patent No.: US 11,092,930 B2
(45) Date of Patent: Aug. 17, 2021

(54) HOLOGRAPHIC AND DIFFRACTIVE OPTICAL ENCODING SYSTEMS

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 16/635,159

(22) PCT Filed: Jan. 14, 2019

(86) PCT No.: PCT/US2019/013523
§ 371 (c)(1),
(2) Date: Jan. 29, 2020

(87) PCT Pub. No.: WO2019/140398
PCT Pub. Date: Jul. 18, 2019

(65) Prior Publication Data
US 2020/0379407 A1    Dec. 3, 2020

Related U.S. Application Data

(60) Provisional application No. 62/617,284, filed on Jan. 14, 2018.

(51) Int. Cl.
*G03H 1/08* (2006.01)
*G02B 5/32* (2006.01)
(Continued)

(52) U.S. Cl.
CPC ............ *G03H 1/0866* (2013.01); *G02B 5/32* (2013.01); *G03H 1/0248* (2013.01);
(Continued)

(58) Field of Classification Search
CPC .. G02B 27/0944; G02B 27/0172; G02B 5/32; G02B 5/188; G03H 1/0005; G03H 1/229;
(Continued)

(56) References Cited

U.S. PATENT DOCUMENTS 5,187,360 A    2/1993    Pasco
5,396,350 A    3/1995    Beeson et al.
(Continued)

FOREIGN PATENT DOCUMENTS

CN    205185315 U    4/2016
WO    2014188149 A1    11/2014
(Continued)

OTHER PUBLICATIONS

International Search Report and Written Opinion dated Dec. 27, 2017 in International Patent Application No. PCT/US17/42467.
(Continued)

*Primary Examiner* — Jade R Chwasz
(74) *Attorney, Agent, or Firm* — Charles C. Yang

(57) ABSTRACT

Holographic and diffractive optical encoding techniques for forming reflection or transmission holograms. The encoding device includes a substrate having an interference pattern that can propagate light along a light propagation path from one side of the substrate to another side of the substrate. Furthermore, an optical element may be used to propagate light according to a four-dimensional light field coordinate system.

23 Claims, 15 Drawing Sheets

(51) Int. Cl.
*G03H 1/02* (2006.01)
*G03H 1/22* (2006.01)

(52) U.S. Cl.
CPC ... *G03H 1/2202* (2013.01); *G03H 2001/2228* (2013.01); *G03H 2222/34* (2013.01); *G03H 2223/14* (2013.01); *G03H 2223/16* (2013.01); *G03H 2223/23* (2013.01)

(58) Field of Classification Search
CPC .... G03H 1/22; G03H 2223/16; G03H 1/0866; G03H 1/0248; G03H 1/2202; G03H 2001/2228; G03H 2222/34; G03H 2223/14; G03H 2223/23; G03H 1/30; G03H 2001/0439; H04N 5/89
USPC .................................................. 359/15, 3, 9
See application file for complete search history.

(56) References Cited

U.S. PATENT DOCUMENTS

| | | | |
|---|---|---|---|
| 5,822,125 A | 10/1998 | Meyers | |
| 6,169,594 B1 | 1/2001 | Aye et al. | |
| 6,326,939 B1 | 12/2001 | Smith | |
| 6,418,254 B1 | 7/2002 | Shikata | |
| 6,487,351 B1 | 11/2002 | Cryan | |
| 6,556,280 B1 | 4/2003 | Kelsey et al. | |
| 7,050,020 B2 | 5/2006 | Uehara et al. | |
| 7,986,374 B2 | 7/2011 | Ijzerman et al. | |
| 8,149,265 B2 | 4/2012 | Smalley et al. | |
| 8,308,329 B1 | 11/2012 | Sethna | |
| 8,345,144 B1 | 1/2013 | Georgiev et al. | |
| 8,442,397 B2 | 5/2013 | Kang et al. | |
| 8,736,675 B1 | 5/2014 | Holzbach et al. | |
| 8,953,012 B2 | 2/2015 | Williams et al. | |
| 8,977,090 B2 | 3/2015 | Lambert et al. | |
| 9,143,678 B2 | 9/2015 | Park et al. | |
| 9,179,134 B2 | 11/2015 | Ranieri et al. | |
| 9,188,737 B2 | 11/2015 | Joseph et al. | |
| 9,343,020 B2 | 5/2016 | Heide et al. | |
| 9,405,124 B2 | 8/2016 | Hirsch et al. | |
| 9,817,626 B2 | 11/2017 | Ur et al. | |
| 9,874,761 B2 | 1/2018 | Van Putten et al. | |
| 9,904,065 B2 | 2/2018 | Jin et al. | |
| 9,945,988 B2 | 4/2018 | Powell | |
| 10,298,915 B2 | 5/2019 | Huh et al. | |
| 10,363,818 B2 | 7/2019 | Coser et al. | |
| 10,432,919 B2 | 10/2019 | Lapstun | |
| 10,488,584 B2 | 11/2019 | Karafin et al. | |
| 10,663,657 B2 * | 5/2020 | Karafin .................. | G06F 3/011 |
| 2002/0028045 A1 | 3/2002 | Yoshimura et al. | |
| 2002/0047893 A1 | 4/2002 | Kremen | |
| 2004/0080938 A1 | 4/2004 | Holman et al. | |
| 2004/0135100 A1 | 7/2004 | Menon et al. | |
| 2004/0240777 A1 | 12/2004 | Woodgate et al. | |
| 2005/0093713 A1 | 5/2005 | Orme | |
| 2005/0243275 A1 | 11/2005 | Curatu | |
| 2005/0260677 A1 | 11/2005 | Saaski | |
| 2006/0028400 A1 | 2/2006 | Lapstun et al. | |
| 2006/0077319 A1 | 4/2006 | Kitamura | |
| 2006/0171007 A1 | 8/2006 | Chen et al. | |
| 2007/0097321 A1 | 5/2007 | Whitehead et al. | |
| 2008/0144174 A1 | 6/2008 | Lucente et al. | |
| 2008/0192313 A1 | 8/2008 | Matsumura et al. | |
| 2010/0125356 A1 | 5/2010 | Shkolnik et al. | |
| 2010/0214634 A1 * | 8/2010 | Kroll .......................... | G03H 1/02 |
| | | | 359/9 |
| 2010/0245824 A1 | 9/2010 | Schwarz et al. | |
| 2010/0277779 A1 | 11/2010 | Futterer et al. | |
| 2010/0278480 A1 | 11/2010 | Vasylyev | |
| 2010/0289870 A1 | 11/2010 | Leister | |
| 2011/0032329 A1 | 2/2011 | Bauza et al. | |
| 2011/0134040 A1 | 6/2011 | Duparre et al. | |
| 2011/0157180 A1 | 6/2011 | Burger et al. | |
| 2011/0242461 A1 | 10/2011 | Escuti et al. | |
| 2012/0050833 A1 | 3/2012 | Bove et al. | |
| 2012/0057040 A1 | 3/2012 | Park et al. | |
| 2012/0206726 A1 | 8/2012 | Pervez et al. | |
| 2012/0300044 A1 | 11/2012 | Thomas et al. | |
| 2013/0027512 A1 | 1/2013 | Aronsson et al. | |
| 2013/0088785 A1 | 4/2013 | Yamamoto | |
| 2013/0170004 A1 | 7/2013 | Futterer | |
| 2013/0188068 A1 | 7/2013 | Said | |
| 2013/0216123 A1 | 8/2013 | Shroff et al. | |
| 2014/0300694 A1 | 10/2014 | Smalley et al. | |
| 2014/0300695 A1 | 10/2014 | Smalley et al. | |
| 2014/0320530 A1 | 10/2014 | Gruber, Jr. et al. | |
| 2015/0002840 A1 | 1/2015 | Pettersson et al. | |
| 2015/0015773 A1 | 1/2015 | Tulyakov et al. | |
| 2015/0016777 A1 | 1/2015 | Abovitz et al. | |
| 2015/0092071 A1 | 4/2015 | Meng et al. | |
| 2015/0178939 A1 | 6/2015 | Bradski et al. | |
| 2015/0197062 A1 | 7/2015 | Shinar et al. | |
| 2015/0227112 A1 | 8/2015 | Liu et al. | |
| 2015/0241608 A1 | 8/2015 | Shian et al. | |
| 2015/0285682 A1 | 10/2015 | Popovich et al. | |
| 2015/0331241 A1 | 11/2015 | Haddick | |
| 2015/0378183 A1 | 12/2015 | Pernice et al. | |
| 2016/0014395 A1 | 1/2016 | Murray et al. | |
| 2016/0037146 A1 | 2/2016 | McGrew | |
| 2016/0041386 A1 | 2/2016 | Moreno | |
| 2016/0091786 A1 | 3/2016 | Kazmierski et al. | |
| 2016/0180511 A1 | 6/2016 | Zhou et al. | |
| 2016/0205394 A1 | 7/2016 | Meng et al. | |
| 2016/0301430 A1 | 10/2016 | Mohamadi | |
| 2016/0309065 A1 | 10/2016 | Karafin et al. | |
| 2017/0139213 A1 | 5/2017 | Schmidtlin | |
| 2017/0214907 A1 | 7/2017 | Lapstun | |
| 2018/0131926 A1 | 5/2018 | Shanks et al. | |
| 2018/0356591 A1 | 12/2018 | Karafin et al. | |
| 2018/0361680 A1 | 12/2018 | Bharti et al. | |
| 2018/0372926 A1 | 12/2018 | Karafin et al. | |
| 2018/0372958 A1 | 12/2018 | Karafin et al. | |
| 2019/0004228 A1 | 1/2019 | Bevensee et al. | |
| 2019/0011621 A1 | 1/2019 | Karafin et al. | |
| 2019/0064435 A1 | 2/2019 | Karafin et al. | |

FOREIGN PATENT DOCUMENTS

| | | |
|---|---|---|
| WO | 2015071903 A1 | 5/2015 |
| WO | 2015148334 A1 | 10/2015 |
| WO | 2016007920 A1 | 1/2016 |
| WO | 2016046514 | 3/2016 |
| WO | 2018014044 A1 | 1/2018 |

OTHER PUBLICATIONS

NZ-743820 Further Examination Report dated Feb. 25, 2019.
NZ-743820 First Examination Report dated Aug. 30, 2018.
NZ-743820 Further Examination Report dated Jul. 9, 2019.
International Search Report and Written Opinion dated Oct. 12, 2017 in International Patent Application No. PCT/US17/42469.
Smith, T.E., "Notebook for Spatial Data Analysis, Part I, Spatial Point Pattern Analysis", (2016) ESE 502, (http://www.seas.upenn.edu/~ese502/#notebook).
International Search Report and Written Opinion dated Nov. 9, 2017 in International Patent Application No. PCT/US17/42679.
CA-3053303 Office action dated Aug. 1, 2019.
CA-3006553 Office action dated Sep. 27, 2019.
"Plastics—Vocabulary", International Organization for Standardization, Switzerland 1999, ISO 472 2013.
AU-2017297630 Examination Report No. 1 dated Aug. 21, 2018.
AU-2019200180 Examination Report No. 1 dated Nov. 26, 2019.
International Search Report and Written Opinion of PCT/US2017/042276 dated Nov. 24, 2017.
International Search Report and Written Opinion dated Mar. 28, 2019 in International Patent Application No. PCT/US2019/013554.
AU-2017297627 Examination Report No. 1 dated Aug. 21, 2018.
Fifty years of Anderson localization, Ad Lagendijk, Bart van Tiggelen, and Diederik S. Wiersma, Phsyics Today 62(8), 24 (2009). (Year: 2009).

(56) References Cited

OTHER PUBLICATIONS

"Energy." In illustrated Dictionary of Science, Andromeda, edited by Michael Allaby. Windmill Books (Andromeda International), 1988. https://search.credorederence.com/content/entry/andidsci/energy/0?institutionId=743 (Year: 1988).

CA-3006528 Office action dated Aug. 30, 2018.

International Search Report and Written Opinion of PCT/US2017/042468 dated Nov. 27, 2017.

International Search Report and Written Opinion dated Jun. 18, 2019 in International Patent Application No. PCT/US2019/013523.

International Search Report and Written Opinion of PCT/US2019/013409 dated Apr. 24, 2019.

International Search Report and Written Opinion dated Oct. 30, 2017 in International Patent Application No. PCT/US17/42462.

* cited by examiner

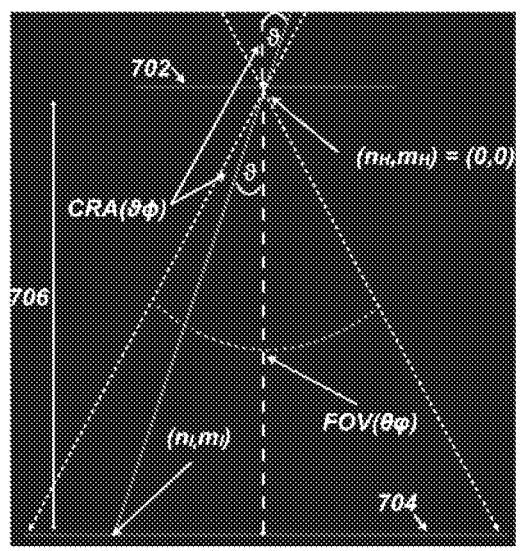
FIG. 7
FIG. 8
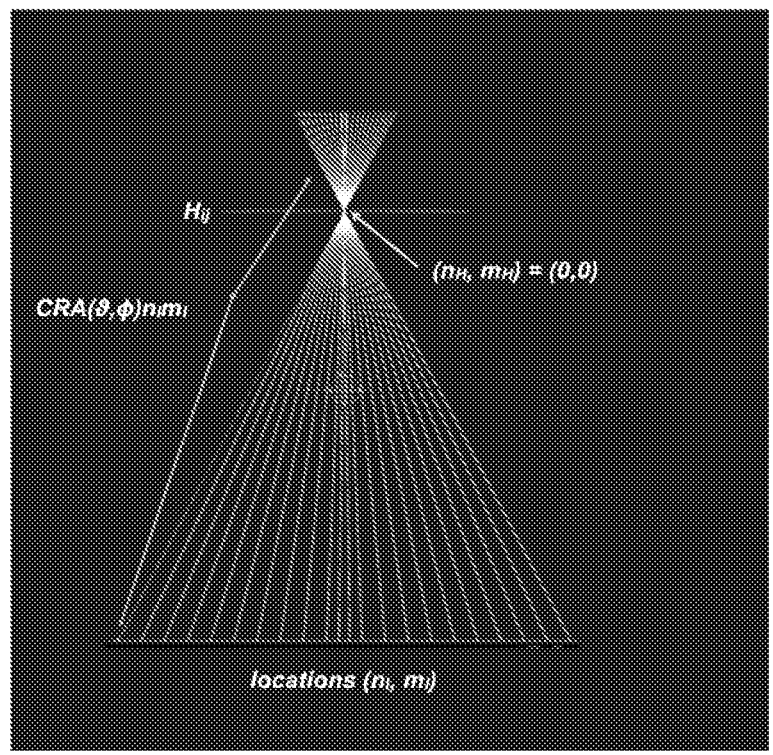

| Variable | Value X | Value Y | Units |
|---|---|---|---|
| DNXY | 480 | 288 | elements |
| DWH | 831.06 | 498.636 | mm |
|  | 32.72 | 19.63 | in |
| OXY | 1 | 1 | integer factor |
| N, M | 64.125 | 42.75 | sub sites for x, y |
| f | 2.764 | 2.764 | mm |
| HWH | 1.731 | 1.731 | mm |
| IWH | 3.463 | 3.463 | mm |
| FOV(θφ) | 64.13 | 64.13 | degrees |
| HW,H ijnHmH | 27.00 | 40.50 | um |
| IW,H ijnlml | 54.00 | 81.00 | um |

| | | Uncorrected: | Perfect: | DOE Prescription: | DOE Corrected: |
|---|---|---|---|---|---|
| | | | | | |

HOLOGRAPHIC AND DIFFRACTIVE OPTICAL ENCODING SYSTEMS

CROSS-REFERENCE TO RELATED APPLICATIONS

This Application claims the benefit of priority to U.S. Provisional Patent Application No. 62/617,284, entitled "Holographic and Diffractive Optical Encoding Systems," filed Jan. 14, 2018, which is incorporated by reference in its entirety.

TECHNICAL FIELD

This disclosure generally relates to optical technology, and more specifically, to holographic and diffractive optical encoding systems for forming reflection or transmission holograms.

BACKGROUND

Holography is a technique that enables a light field to be recorded and later reconstructed when the original light field is no longer present, due to the absence of the original objects. Holography can be thought of as somewhat similar to sound recording, whereby a sound field created by vibrating matter like musical instruments or vocal cords, is encoded in such a way that it can be reproduced later, without the presence of the original vibrating matter.

There are 2 basic types of holograms: reflection holograms and transmission holograms. Reflection holograms reflect the light. The light field is formed as the light used for reconstruction reflects from the interference pattern within the photographic medium. Transmission holograms transmit the light. During reconstruction, the light diffracts through the hologram. In general, reflection holograms offer the highest quality images, but are the most expensive to produce. Transmission holograms are most commonly seen since they can be inexpensively mass-produced in the form of embossed holograms. Credit cards often contain embossed holograms. It is to be appreciated that the embodiments discussed herein can be implemented either types of holographs, and moreover, it is to be appreciated that techniques to encode either types of holograms and convert reflection holograms to transmission holographs, and vice versa, are well known in the art and need not be repeated here.

SUMMARY

An embodiment of a waveguide of the present disclosure may include a substrate comprising a photographic medium and an interference pattern encoded in the photographic medium, the interference pattern defining an array of substrate sites in the substrate. The interference pattern is configured to propagate light along light propagation paths extending from light locations on a first side of the substrate toward a second side of the substrate. The light propagation paths comprise sets of light propagation paths that extend through a same substrate site and a same light location, wherein each set of light propagation paths are configured to extend in substantially a unique direction on the second side of the substrate and converge from the same substrate site to the same light location on the first side of the substrate, the unique direction being determined by an angular direction of a chief ray propagation path in each set of light propagation paths. As such, the array of substrate sites is configured to propagate light according to a four-dimensional light field coordinate system comprising spatial coordinates defined by positions of the substrate sites and angular coordinates defined by the unique directions of the sets of light propagation paths for each substrate site.

In an embodiment, a light field is encoded as an interference pattern of the photographic medium. When suitably lit, the interference pattern diffracts the light into a reproduction of the original light field and the objects that were in it appear to still be there, exhibiting visual depth cues such as parallax and perspective that change realistically with any change in the relative position of the observer. Photographic mediums, including photographic emulsions, may include dichromated gelatin, photoresists, photothermoplastics, photopolymer, and photorefractives, among others.

In another embodiment, an array of waveguide may include a substrate comprising a photographic medium; an interference pattern encoded in the photographic medium, the interference pattern defining an array of substrate sites in the substrate, each substrate site comprising a plurality of substrate subsites; and an optical element, the optical element defining an array of optical element sites each corresponding to a respective substrate site, each optical element site comprising a plurality of optical element subsite locations. The interference pattern is configured to propagate light along light propagation paths extending through the substrate subsites of each substrate site to the optical element subsite locations of the respective optical element site, wherein the light propagation paths comprise sets of light propagation paths that extend through a same optical element site and a same substrate subsite of a corresponding substrate site. Each set of light propagation paths extend from the optical element away from substrate in substantially a unique direction and converge from different optical element subsite locations of the same optical element site to the same substrate subsite of the corresponding substrate site, the unique direction being determined by an angular direction of a chief ray propagation path in each set of light propagation paths. As such, the array of optical element sites is configured to propagate light according to a four-dimensional light field coordinate system comprising spatial coordinates defined by positions of the optical sites and angular coordinates defined by the unique directions of the sets of light propagation paths for each optical site.

BRIEF DESCRIPTION OF THE DRAWINGS

FIG. 7 is an illustration of a chief ray angle for an ISA subsite location;

FIG. 8 is an illustration of the chief ray propagation paths of an HLA sub site location;

DETAILED DESCRIPTION

An embodiment according to the principles of an aspect of the present disclosure may include two distinct planes—the Holographic Lenslet Array (herein, "HLA"), which may include an interference pattern encoded in a photographic medium that defines many distinct holographic elements, and the Illumination Source Array (herein, "ISA"), which may be positioned beneath the HLA. The HLA elements may each be divided into N×M subsites at HLA subsite locations. An aspect of this disclosure describes the encoding for these subsites so the HLA elements substantially function as an array of lenses. An embodiment according to the principles of another aspect of the present disclosure may include encoding an interference pattern configured to direct light as similar to the ISA to an optical element having optical element subsites similar to the HLA subsites.

Figure 1:
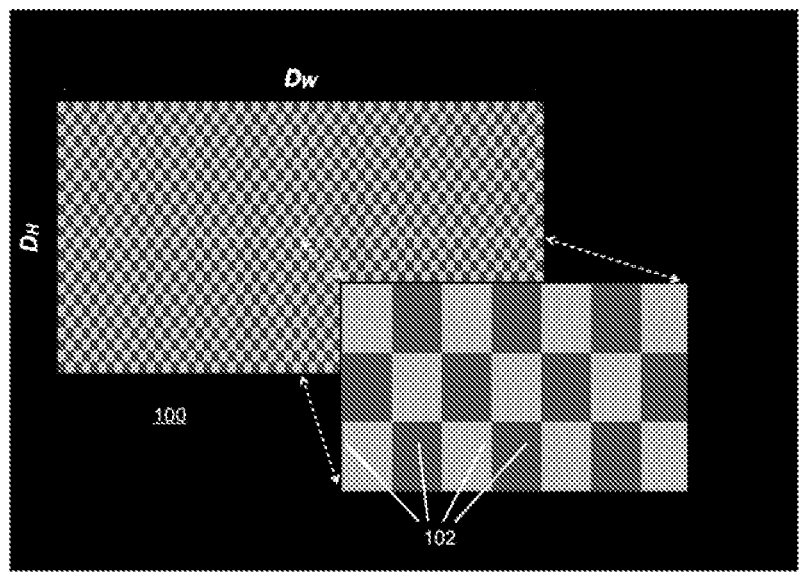
FIG. 1 is an illustration of a holographic lenslet array ("HLA") sites.

Turning to FIG. 1, which shows an embodiment of the HLA 100, the HLA 100 may include a plurality of HLA elements 102, each comprising individual digital holograms encoded to substantially recreate the properties of a theoretically perfect lens. These holograms may have a digitally constructed optical profile, and functions without limitations associated with microscopic optical elements.

Figure 2:
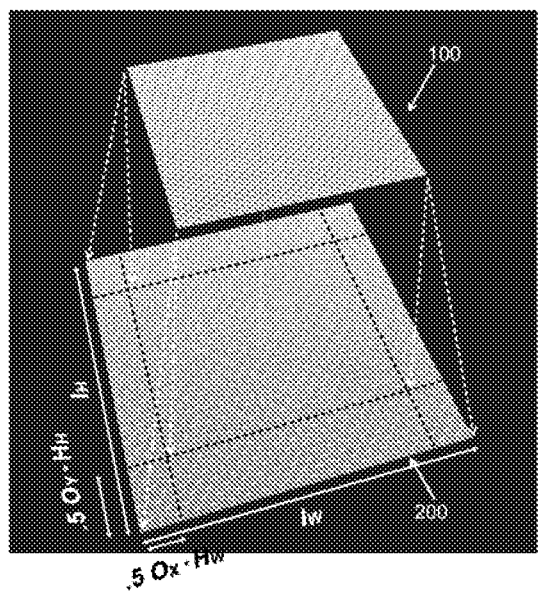
FIG. 2 is an illustration of corresponding HLA and illumination source array ("ISA") sites.

Turning to FIG. 2, which shows an embodiment of the ISA 200, the ISA includes a plurality of light sources that direct light to corresponding locations on the HLA site 102.

In an embodiment, the HLA and ISA planes are each subdivided into multiple locations, called sites. In an embodiment, each site may be independently encoded. The HLA and ISA sites may be of a regular, non-regular or overlapping configuration. FIG. 1 shows a diagram of the HLA sites 102.

In an embodiment, the HLA and ISA sites may be regularly packed rectangles with overlapping regions between ISA sites, as shown in FIG. 2. It is to be appreciated that other designs in accordance with the principles disclosed herein may be used and are contemplated in this disclosure.

The desired quantity of HLA and ISA sites per display defines both the viewable resolution of the display and size of each physical site defined by $$H_W = \frac{D_W}{DN_X}, H_H = \frac{D_H}{DN_Y}$$

$$I_W = H_W * (1 + O_X), I_H = H_H * (1 + O_Y)$$

Where $H_{WH}$ and $I_{WH}$ are the physical width and height measurements of each HLA and ISA sites respectively, $D_{WH}$ is the total width and height of the full display surface, $DN_{XY}$ is the total number of individual HLA sites in the vertical and horizontal dimensions in relation to the overall HLA display surface, and $O_{XY}$ is an overlap factor to account for the fact that each ISA region can be larger than its corresponding HLA region. These parameters are shown in FIGS. 1 and 2. For non-zero $O_{XY}$, the illumination sources that reside within the overlap region of the ISA may contribute not only to the HLA directly above it, but also to at least one neighboring HLA.

Non-regular configurations may be determined with more advanced computation.

Locations containing a co-centered HLA and ISA site pair are placed within a regular coordinate system that can be indexed by the variables i in the x-direction and j in the y-direction:

$$HLA\ H_{ij} <=> ISA\ I_{ij}$$

Figure 3:
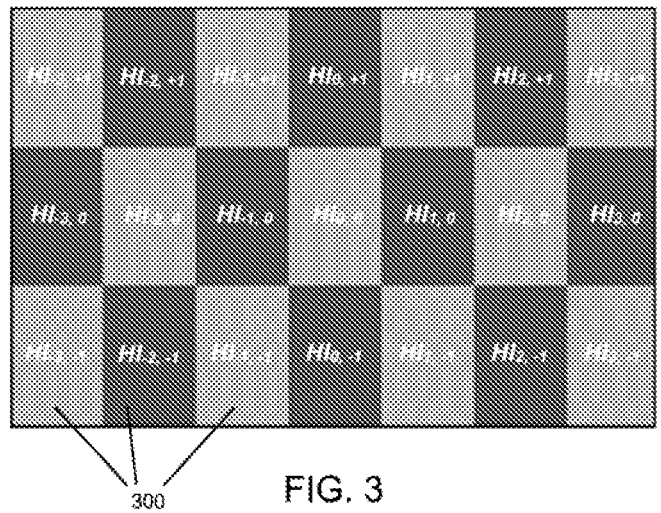
FIG. 3 is an illustration of a coordinate system for the HLA and ISA sites.

As shown in FIG. 3, the origin i,j=0,0 is located at the center of the display. The range of values for i and j are $$i = \frac{-(DN_X - 1)}{2} \to \frac{(DN_X - 1)}{2}, j = \frac{-(DN_Y - 1)}{2} \to \frac{(DN_Y - 1)}{2}$$

For simplicity, HLA $H_{ij}$ and ISA $I_{ij}$ pairs will collectively be referred to as $HI_{ij}$.

$$H_{ij}\ \&\ I_{ij}\ pair <=> H_{ij}$$

Each one of the $HI_{ij}$ locations represents a single optical element 300, comprising corresponding HLA and ISA sites, from within the entire display system with dimensions $D_W \times D_H$.

$D_W \times D_H$ may exhibit varying W,H values across the surface of the display system and may be represented as a function of the index position.

Figure 4:
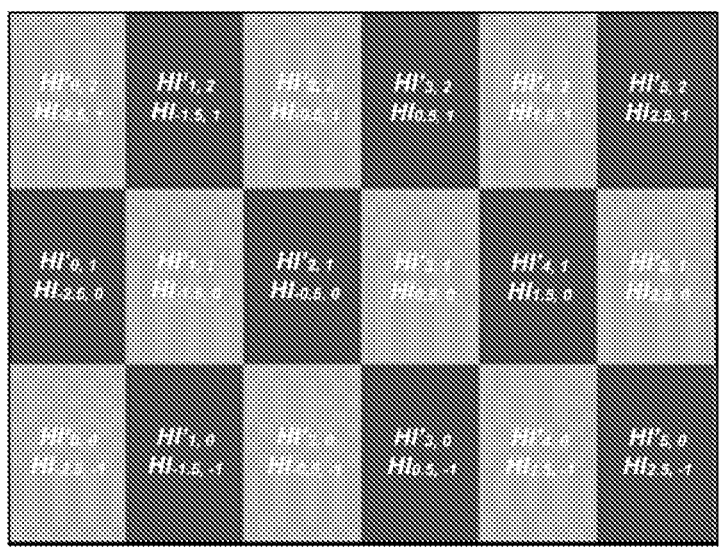
FIG. 4 is an illustration of another coordinate system for the HLA and ISA sites.

To account for even, odd and non-integer $DN_{XY}$ values appropriately where $HI_{00}$ is not at the center of an HLA site, the $HI_{ij}$ coordinate can be established by considering $HI'_{ij}$ as shown in FIG. 4 where $HI'_{00}$ starts from the bottom left HLA position on the display surface and increments such that $$i' = 0 \to (DN_X - 1), j' = 0 \to (DN_Y - 1)$$

The indices for the two coordinate systems $HI_{ij}$ and $HI'_{ij}$ are related to one another through simple offsets:

$$i = i' - \frac{(DN_X - 1)}{2}, \quad j = j' - \frac{(DN_Y - 1)}{2}$$

With each HLA optical center appropriately accounted for, it is possible to calculate the exact location of each $HI_{ij}$ element center in reference to the display origin.

$$HI_{ij}x_c = i * HLA_W$$

$$HI_{ij}y_c = j * HLA_H$$

With the holographic lens array coordinates accounted for, each $HI_{ij}$ site 300 in the system may now contain an additional sub-site coordinate system defined by N subdivisions in the x-axis and M subdivisions in the y-axis. In other words, both the ISA and the HLA sites of the $HI_{ij}$ site 300 are each subdivided into N'M individual regions. In order to completely specify a set of coordinates for the HI element, the following notation is used.

$$HI_{ij}n_H m_H n_I m_I$$

Here, ij are the indices for the ISA and the HLA sites of the HLA element, $n_H m_H$ represents the indices for the HLA sub-site of the HLA site, while $n_I m_I$ represents the indices for the ISA sub-site of the ISA site.

Figure 5:
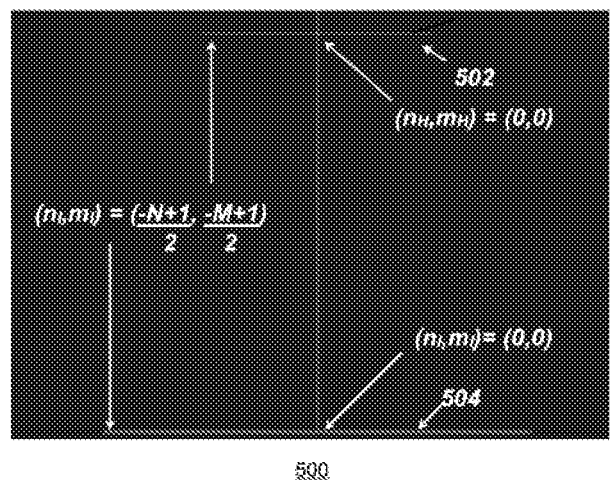
FIG. 5 is an illustration of the geometry of the HLA and ISA sites.

As shown in FIG. 5, the size of each HLA sub-site is determined by dividing the width of the HLA site 502 of the $HI_{ij}$ HLA optical element 500 by N in the x-axis, and the height of the HLA site 502 by M in the y-axis. The size of the ISA sub-site is defined similarly based on the width and height of the ISA site 504 the $HI_{ij}$ HLA optical element 500.

$$H_{Wijnm} = \frac{H_W}{N}, \quad H_{Hijnm} = \frac{H_H}{M}$$

$$I_{Wijnm} = \frac{I_W}{N}, \quad I_{Hijnm} = \frac{I_H}{M}$$

Each HLA and ISA sub-site may exhibit varying values from site to site and can be expressed as a function of the index position.

The HLA and ISA may have differing dimensions, but share a common (0,0) point at the center of each $HI_{ij}$ HLA optical element. The $n_H m_H n_I m_I$ sub-site indices maybe treated in the same fashion as the above ij HLA element indices such that $$n_H = \frac{-(N-1)}{2} \to \frac{+(N-1)}{2}, \quad m_H = \frac{-(M-1)}{2} \to \frac{+(M-1)}{2}$$

$$n_I = \frac{-(N-1)}{2} \to \frac{+(N-1)}{2}, \quad m_I = \frac{-(M-1)}{2} \to \frac{+(M-1)}{2}$$

Both the HLA and ISA sub-sites at each $HI_{ij}$ share the identical N×M coordinate system, but may have differing physical locations between the planes outside of the center axis where $n_I = m_I = n_H = m_H = 0$.

The physical location of a particular HLA sub-site in units of length is given by $$H_{ijm_H n_H}x_c = H_{Wijnm} * n_H$$

$$H_{ijm_H n_H}y_c = H_{Hijnm} * m_H$$

Similarly, the physical location of a particular ISA sub-site in units of length is given by $$I_{ijm_I n_I}x_c = I_{Wijnm} * n_I$$

$$H_{ijm_I n_I}y_c = I_{Wijnm} * m_I$$

Figure 6:
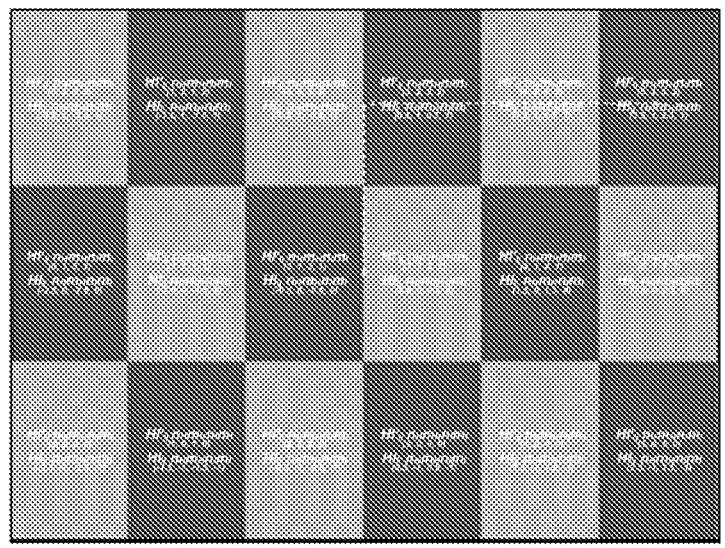
FIG. 6 is an illustration of a coordinate system for the HLA and ISA subsites.

Each index may be defined by an integer or an integer–0.5. We find it useful to also define another coordinate system where $(n_H, m_H) = (0,0)$ is not located at the center of the HLA sub-site. This coordinate system as shown in FIG. 6, where (0,0) is at the lower left corner of the sub-site, is denoted by $HI'_{ij}n'_H m'_H n'_I m'_I$. In this system, the sub-site location indices have the following ranges.

$$n'_H = 0 \to (N-1), \quad m'_H = 0 \to (M-1)$$

$$n'_I = 0 \to (N-1), \quad m'_I = 0 \to (M-1)$$

where $$n_H = n'_H - \frac{(N-1)}{2}, \quad m_H = m'_H - \frac{(M-1)}{2}$$

$$n_I = n'_I - \frac{(N-1)}{2}, \quad m_I = m'_I - \frac{(M-1)}{2}$$

It is to be noted that all of the above assumes that the configurations of the HLA and ISA sites are uniform and regular, but such configuration is not to be understood as required. It is to be appreciated that the principles of the present disclosure may be applied for other configurations of the HLA and ISA sites as contemplated herein.

The distance 706 between the parallel HLA and ISA planes 702 and 704 is denoted f. This parameter is designed to provide control over the field of view ("FOV") and chief ray angle ("CRA") of each HLA element $HI_{ij}$. The CRA is the ray that connects any ISA subsite location $n_I$, $m_I$ to the center of HLA site the HLA element $H_{ij}$, which is defined equivalently by the indices $(n_H, m_H) = (0,0)$, as shown in FIG. 7.

The maximum full FOV angle of each HLA is determined by $$FOV(\theta) = \operatorname{atan}\left(\frac{I_W}{f}\right)$$

$$FOV(\varphi) = \operatorname{atan}\left(\frac{I_H}{f}\right)$$

The CRA half angle that forms between the center of the HLA site and an ISA subsite location is a function of the ISA sub-site location coordinate $(x, y) = (I_{ijn_I m_I}x_c, I_{ijn_I m_I}y_c)$ and the parameter f.

$$CRA(\vartheta)_{n_I m_I} = \operatorname{atan}\left(\frac{I_{ijn_I m_I}x_c}{f}\right)$$

$$CRA(\phi)_{n_I m_I} = \operatorname{atan}\left(\frac{I_{ijn_I m_I}x_c}{f}\right)$$

Note that for each ISA sub-site location defined by $n_I$, $m_I$, there is a different CRA, as shown in FIG. 8, which illustrates a set of CRA angles, one for each ISA subsite location $(n_I, m_I)$ for a corresponding HLA site $H_{ij}$. For $(n_H, m_H) = (0,0)$, the input reference beam angle is equivalent to the output object beam angle (assuming a system where there are equivalent steps between each of the formed CRA angles, uniformly-sized HLA sub-sites, and uniformly-sized ISA sub-sites).

Both the CRA angles and HLA/ISA sites may be defined by non-regular spacing or angles for more complex optical configurations, and it is to be appreciated that the principles of the present disclosure may be applied for these configurations as contemplated herein.

Figure 9:
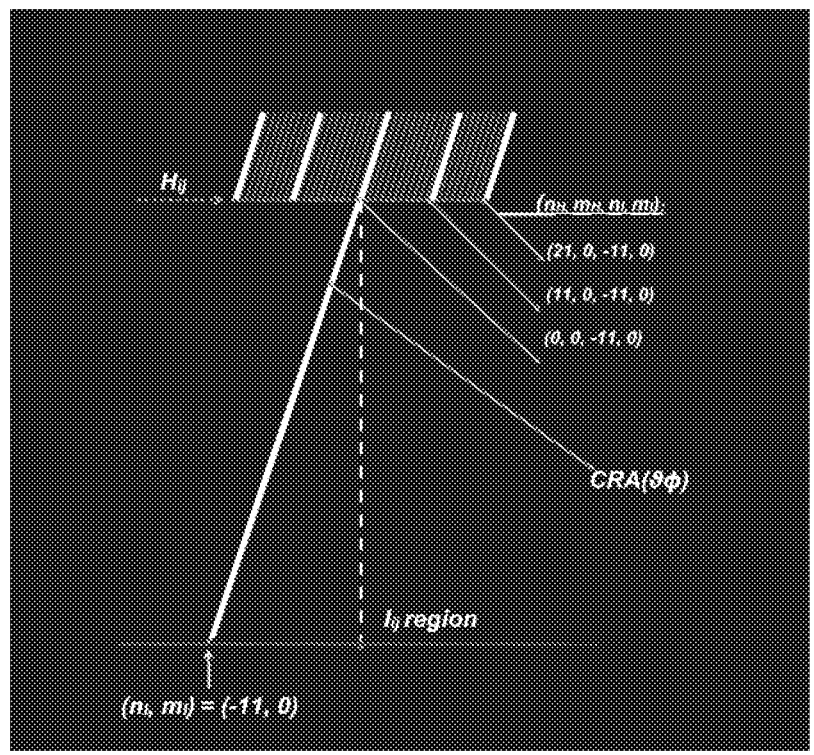
FIG. 9 is an illustration of the common input reference beam angle for an ISA sub-site location and a plurality of HLA sub-site locations.

In an embodiment, each individual HLA site $H_{ij}$ is encoded as follows:

A) For each ISA sub-site location $I_{ijn_Im_I}$, the associated CRA defines the center ray which sets a single common input reference beam angle for each of the N×M HLA sub-site locations of the HLA site $H_{ij}$, as shown in FIG. 9. In other words, all the input reference beam angles are identical for a given $(n_I, m_I)$.

Figure 10:
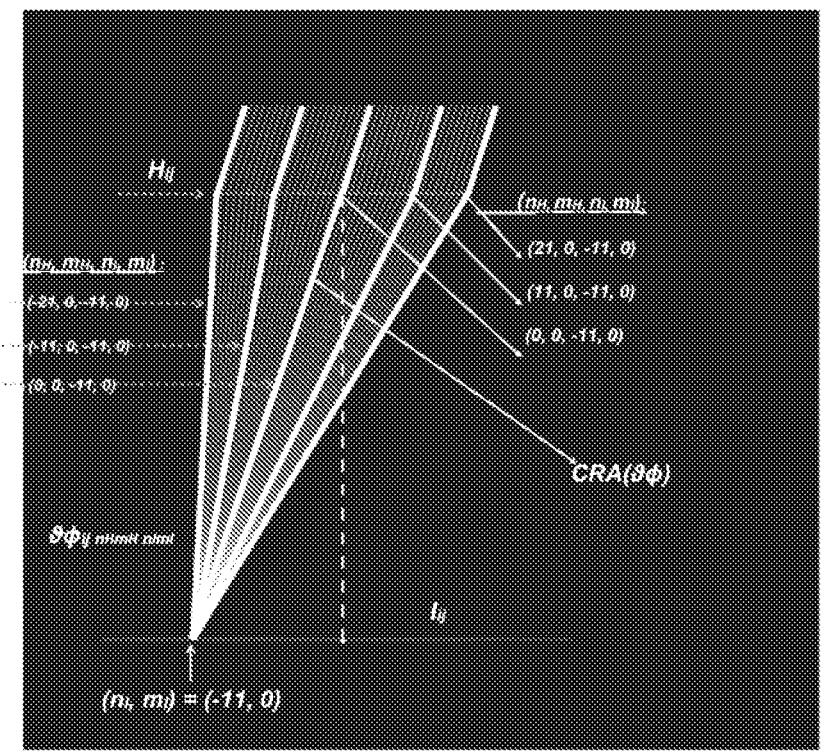
FIG. 10 is an illustration of the object beam angles for an ISA sub-site location and a plurality of HLA sub-site locations.

B) Every ray that is drawn from each HLA sub-site location $H_{ijn_Hm_H}$ should converge on the ISA sub-site location $I_{ijn_Im_I}$, as shown in FIG. 10. This set of rays forms the output object beam angles for each of the N×M HLA sub-site locations.

C) The angle for each ray between the ISA and HLA planes is a function of the ISA coordinate $(x, y)=(I_{ijn_Im_I}x_c, I_{ijn_Im_I}y_c)$, the HLA coordinate $(x, y)=(H_{ijn_Hm_H}x_c, H_{ijn_Hm_H}y_c)$ and the distance between the HLA and ISA planes f.

$$\vartheta_{ijn_Hm_Hn_Im_I} = \operatorname{atan}\left(\frac{(H_{ijn_Hm_H}x_c - I_{ijn_Im_I}x_c)}{f}\right)$$

$$\varphi_{ijn_Hm_Hn_Im_I} = \operatorname{atan}\left(\frac{(H_{ijn_Hm_H}y_c - I_{ijn_Im_I}y_c)}{f}\right)$$

D) For each ISA sub-site location with indices $(n_I, m_I)$, there will be N×M output reference beam angles. Since there are N×M ISA sub-site locations, each HLA-ISA pair will require $N^2 \times M^2$ input reference-output object angle encoding pairs.

E) The entire display, having $DN_x \times DN_y$ HLA elements, will require encoding $DN_x \times DN_y \times N^2 \times M^2$ input reference—output object angle pairs.

Figure 11A:
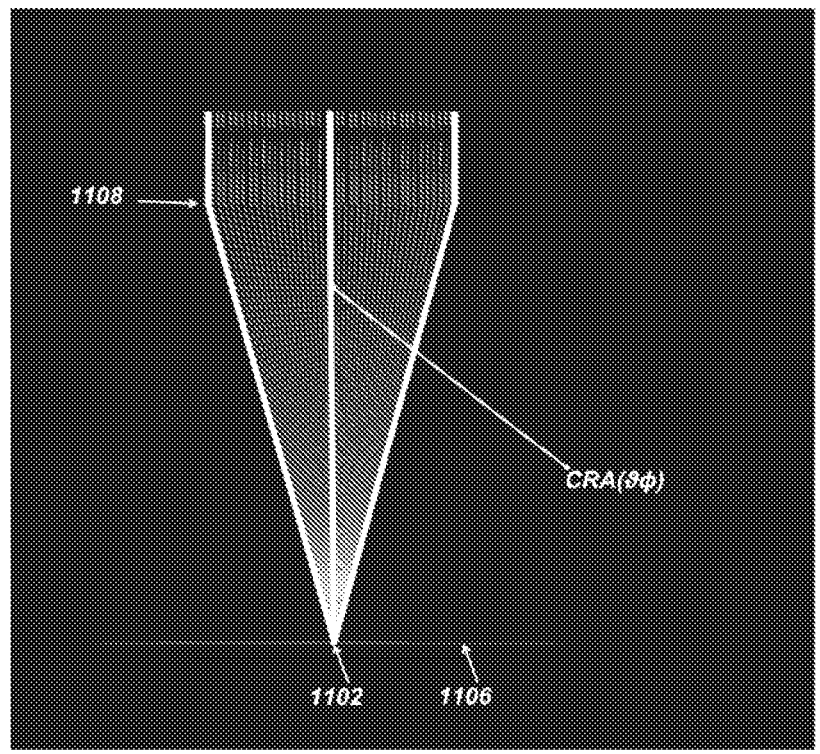
FIGS. 11A and B are illustrations of reference and object beam angles.
Figure 11B:
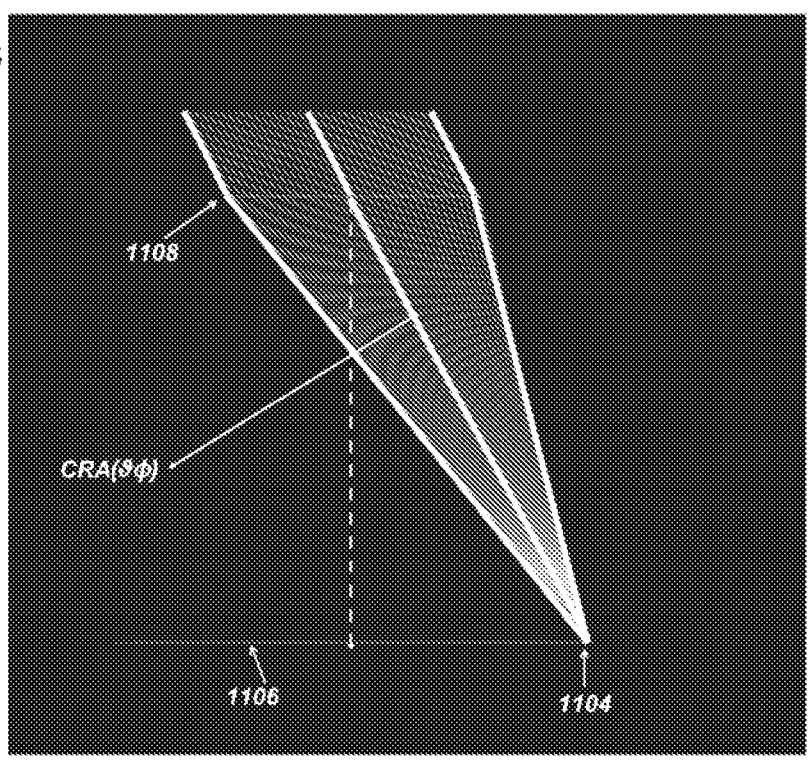

FIGS. 11A and 11B shows the encoding pairs for two different ISA sub-site locations 1102 and 1104 for the same ISA site 1106, which may have a coordinate of $I_{ij}$ and different subsite locations of the HLA site 1108, which may have a coordinate of $H_{ij}$.

Figures 12, 13:
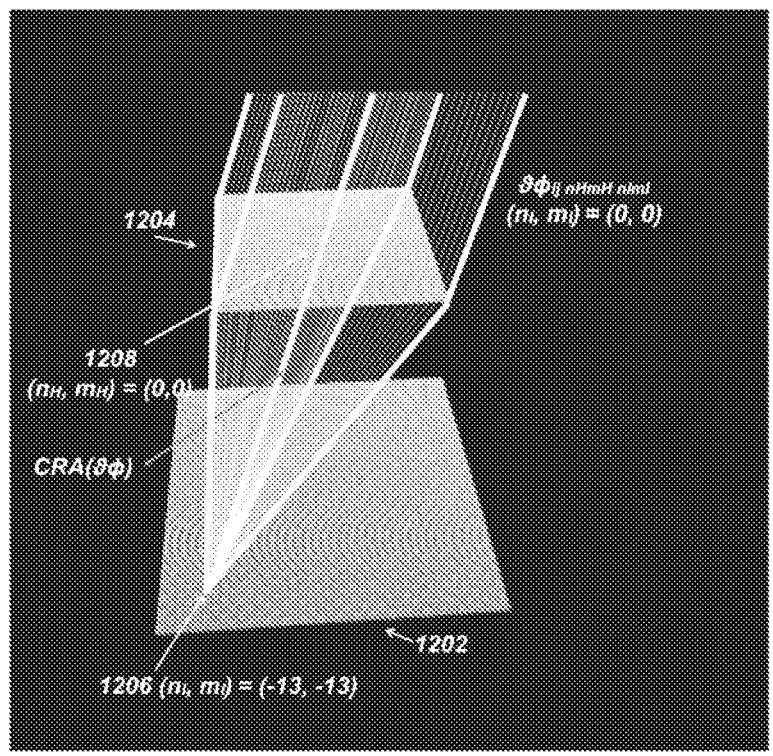
FIG. 12 is an perspective illustration of the reference and object beam angles in three-dimensions.
FIG. 13 is an illustration of exemplary encoding parameters for an interference pattern of the present disclosure.

FIG. 12 shows a three-dimensional view of the encoding pairs for a single ISA sub-site location 1206 and a single HLA site 1204. The ISA sub-site location 1206 may have a CRA as defined by a chief ray propagation path 1208.

An embodiment is provided in FIG. 13 as Example A to illustrate the principles of the present disclosure. In Example A, Illumination Source Assumptions for Consideration may include the following:
Bayer RGB, non-laser, diffuse illumination source plane
Diffused surface for HOE focus
Must be white light visible
Transmissive element between viewer and illumination source In Example A, single HOE encoding exceeds the state-of-the-art (SOTA) HOE encoding methodologies today. The SOTA process limitations include:
100 um² minimum sub-site encoding size
Maximum of one reference angle (θφ) per 10 degrees with a multiplexed effective transmission reduction of $1/(\theta^*\varphi)$ (please confirm assumption)

1/L effective transmission (or less), where L=number of multiplexed λ

In view of the above discussions of structural relationship of the HLA and ISA sites and subsites and the encoding of an HLA site for a plurality of ISA subsite locations in an ISA site, one of ordinary skilled in the art will appreciate that the principles of an aspect of the present disclosure may be implemented to a waveguide.

In an embodiment, a waveguide of the present disclosure may include a substrate comprising a photographic medium and an interference pattern encoded in the photographic medium such that the interference pattern defines an array of substrate sites in the substrate. In an embodiment, the interference pattern comprises holograms encoded to direct light as an array of lenslets, thereby forming a holographic lenslet array ("HLA") as discussed above. The HLA may include a plane subdivided into sites, such as sites Hij discussed above. The HLA sites corresponds to the substrate sites. Furthermore, the interference pattern of the substrate may be configured to propagate light along light propagation paths extending from light locations (e.g, ISA subsite locations) on a first side of the substrate (e.g., HLA site Hij) toward a second side of the substrate (e.g., HLA site Hij). Examples of the light propagation paths are shown in FIGS. 10-12 above.

In an embodiment, the light propagation paths include sets of light propagation paths that extend through a same substrate site (e.g., the HLA site 1108 in FIGS. 11A and 11B, or the HLA site 1204 in FIG. 12) and a same light location (e.g., ISA sub-site locations 1102 and 1104 in FIGS. 11A and 11B or the ISA sub-site location 1206 in FIG. 12), wherein each set of light propagation paths are configured to extend in substantially a unique direction on the second side of the substrate as shown in FIG. 10 and converge from the same substrate site to the same light location on the first side of the substrate. As illustrated in FIG. 10, the unique direction is determined by an angular direction of a chief ray propagation path in each set of light propagation paths.

In an embodiment, as discussed above with respect to FIGS. 7-9, the chief ray propagation path comprises the light propagation path between one of the ISA subsite locations and a center of the corresponding respective subsite of the HLA. The unique direction of each set of light propagation paths is determined by a chief ray angle ("CRA") of the respective chief ray propagation path. As such, the array of substrate sites is configured to propagate light according to a four-dimensional light field coordinate system comprising spatial coordinates defined by positions of the substrate sites (e.g., the HLA site 1108 in FIGS. 11A and 11B, or the HLA site 1204 in FIG. 12) and angular coordinates defined by the unique directions (e.g., the CRA) of the sets of light propagation paths for each substrate site location.

In an embodiment as shown in FIGS. 10-12, for each ISA subsite location of a first site of the ISA, a corresponding site of the HLA in the interference pattern is encoded with a common input reference beam angle determined by the CRA of the respective chief ray propagation path for each ISA subsite location with output object beam angles determined by light propagation paths converging from HLA subsite locations in the corresponding site of the HLA to each ISA subsite location of the first site of the ISA.

Figure 14:
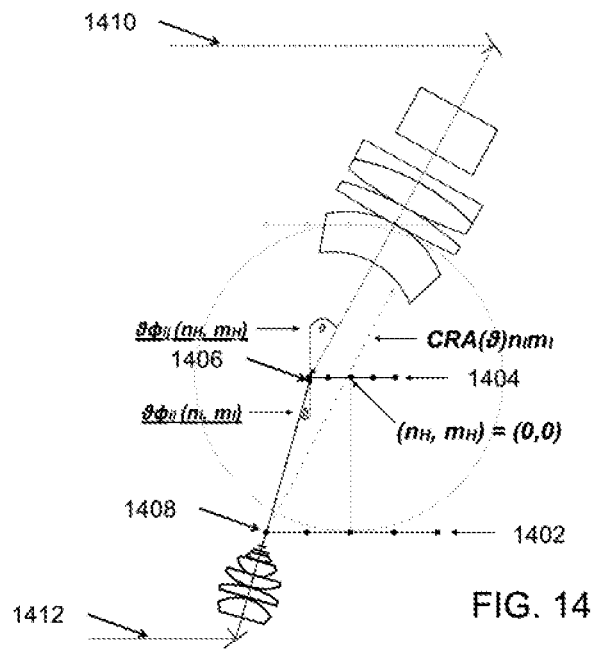
FIG. 14 is an illustration of a first embodiment of encoding an interference pattern of the present disclosure.

In an embodiment, encoding methodology for encoding an HLA site assumes that for each N×M input reference angle there is an associated N×M output object angle as defined in the above discussion wherein a single beam is split into the reference and object beam as generally performed with holographic encoding methodologies. As shown in FIG. 14, for the first site 1402 of the ISA and the corresponding site of the HLA 1404, one of the respective HLA subsite locations 1406 is encoded at one time with a pair of the common input reference beam angle 1410 for a single respective ISA subsite location 1408 and one of the output object beam angles 1412 for the single respective ISA subsite location 1408

It is to be appreciated that while illustrations of the present disclosure, such as FIG. 14, may illustrate the object beams from below, or the opposite side of the reference beam, thus representing a reflection hologram or the like, one of ordinary skill in the art would readily appreciate that the illustrations provided herein are intended only to demonstrate the principles of the present disclosure and is not intended to be limiting. Based on the principles disclosed or demonstrated in the present disclosure, it should be readily apparent to one of ordinary skill in the art that embodiments in the present disclosure need not have the explicit orientation illustrated, and encoding methodologies of the present disclosure may be implemented using the same/similar sides, edges, off-axis embodiments providing for transmission, volume, edge lit, gratings, diffraction, refraction, and the like.

Anyone skilled in the art will understand the additional optics, motor control systems and photonics involved in encoding the photopolymer as noted in this disclosure.

The encoding approach of FIG. 14 may include the associated hardware known in the art for reflection, transmission and/or volume holographic photopolymer media, or the like, and provides the most flexible, albeit most time consuming, optical digital encoding configuration as there is a one-to-one mapping between input and output rays.

In this system, both the reference and object beams are directed to strike a given HLA sub-site location, with a spot size of $H_{Wijnm}$, $H_{Hijnm}$, at an angle as determined by the $CRA(\vartheta\varphi_{n_H m_H n_I m_I})$ wherein the beam and/or optics are rotated about an axis as depicted, but not limited to, in the above figure.

However, given an exemplary 1.731×1.731 mm² HLA element size, the above SOTA limitations would allow for a single reference beam per wavelength at 33% transmission per color and ~289 ($17^2$) encoded HLA sub-sites.

In comparison, Example A provides for a 27×40.5 um sub-site encoding size and 2,741.3 (64.125×42.75) encoded HLA sub-sites.

Further, each HLA sub-site may be configured to provide a unique output angle for each of N×M reference angles. However, the SOTA only provides up to 36 ($6^2$) reference angles at the expense of 1/36 effective transmission multiplied against the 1/3 multiplexed RGB transmission reduction, resulting in only approximately 1% of transmitted illumination per viewed sub-site for a fraction of the required encoding information.

Alternatively, for more efficient encoding methodologies, one may encode multiple HLA or ISA sub-site locations simultaneously by fabricating an offset optical system that produces the desired effect for HLA encoding. This may be performed in one of two different ways due to encoding system functionality.

Figure 15:
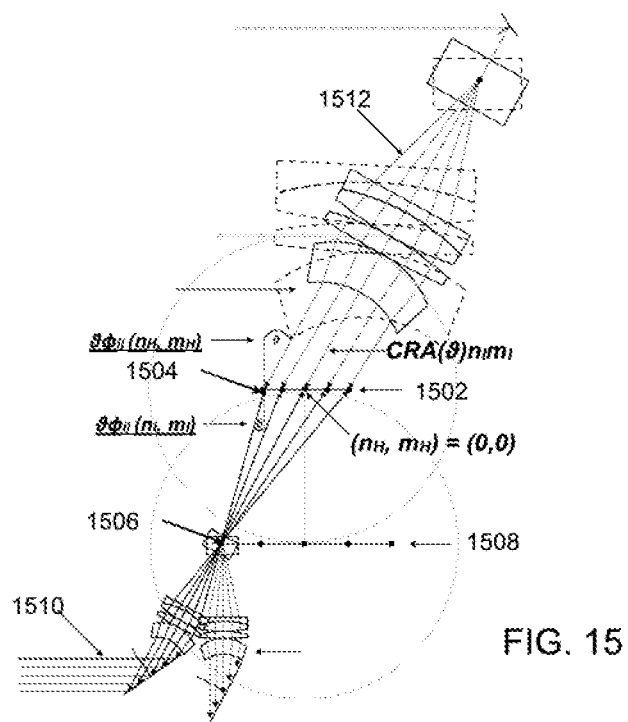
FIG. 15 is an illustration of a second embodiment of encoding an interference pattern of the present disclosure.

In an embodiment, as shown in FIG. 15, a plurality of HLA subsite locations 1504 of an HLA site 1502 is encoded for each possible $CRA(\vartheta\varphi)_{n_I m_I}$ of an ISA subsite location 1506 with the common input reference beam angle 1512 and the respective plurality of the output object beam angles 1510. This is repeated for other ISA subsite locations 1506 in the ISA site 1508. This approach may rely on fabricated optics that direct the beams appropriately to each $HI_{ij}n_H m_H n_I m_I$ sub-site location. This encoding process is repeated for each of the N×M ISA sub-site locations as defined by the $CRA(\vartheta\varphi)$ and/or as possible given the photopolymer angular response and/or encoding system minimum sub-site size. This approach may be implemented with an optical system having an orientation that aligns the optical CRA with the encoded CRA, or the alternative off-axis optical path wherein the optics remain parallel to the HLA plane and the rays are oriented such that they are offset from within a larger entrance pupil and are focused according to the focus of the optical system producing the same beam steering as required for the encoding process without the keystoning associated with converged optics.

Figure 16:
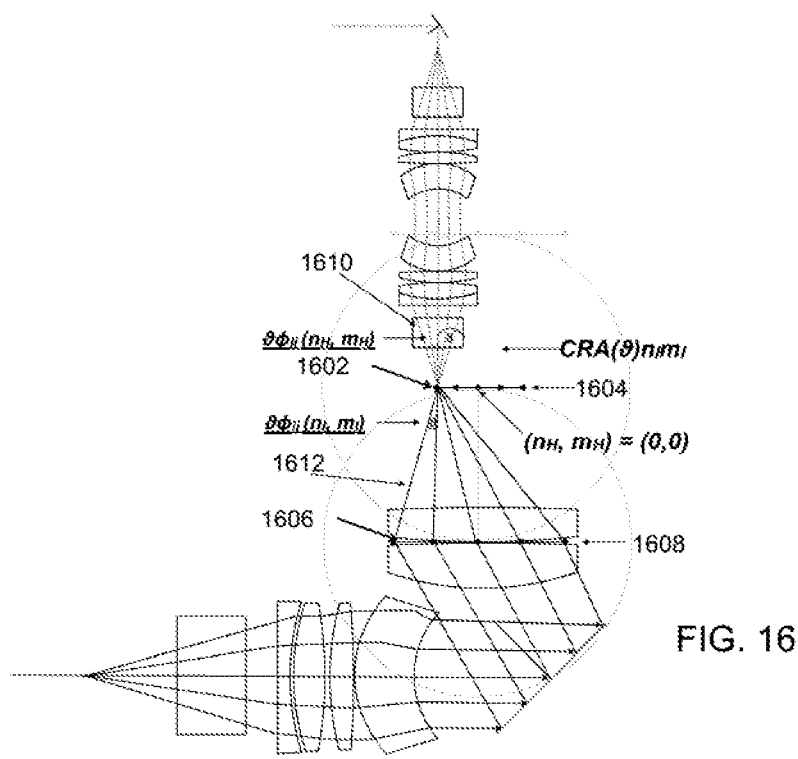
FIG. 16 is an illustration of a third embodiment of encoding an interference pattern of the present disclosure.

In an embodiment, as shown in FIG. 16, one of the HLA subsite locations 1602 of an HLA site 1604 is encoded at one time with a plurality of common input reference beam angles 1610 for a plurality of ISA subsite locations 1606 of an ISA site 1608 and the respective plurality of the output object beam angles 1612 for the respective plurality of ISA subsite locations 1606. This process is repeated for other HLA sub-site locations 1602 with the corresponding converging object beam rays. This approach may be implement with offset optics designed to converge at a single sub-site location wherein the formed angles accurately reconstruct the necessary angles formed between the designated HLA sub-site location, the ISA $n_H$, $m_H$ subsite locations and the required reference angles defining the desired HLA sub-site FOV. Optical elements here are demonstrated as folded for exemplary purposes only. The reference beam angles may further be defined or limited by the photopolymer response.

It is to be appreciated that while illustrations of the present disclosure, such as FIGS. 15 and 16, may illustrate the object beams from below, or the opposite side of the reference beam, thus representing a reflection hologram or the like, one of ordinary skilled in the art would readily appreciate that the illustrations provided herein are intended only to demonstrate the principles of the present disclosure and is not intended to be limiting. Based on the principles disclosed or demonstrated in the present disclosure, it should be readily apparent to one of ordinary skill in the art that embodiments in the present disclosure need not have the explicit orientation illustrated, and encoding methodologies of the present disclosure may be implemented using the same/similar sides, edges, off-axis embodiments providing for transmission, volume, edge lit, gratings, diffraction, refraction, and the like.

Leveraging real optics rather than the brute-force methodology of FIG. 14 described limits the accuracy of the encoding procedure not only to the accuracy of the motion control hardware, but also the accuracy of the optical system itself. However, the brute force methodology involves up to $N^2 \times M^2$ encoding exposures, whereas the offset optics methodologies of FIGS. 15 and 16 both involve only N×M encoding exposures due to the fact that input and output angles are paired together during each exposure. In FIG. 15, all the HLA sub-sites are encoded simultaneously for each CRA, and in FIG. 16, all the angles are encoded simultaneously for each HLA sub-site.

Each of these embodiments provides conversion into an appropriate transmission and/or volume hologram to produce the anticipated optics effects.

The above encoding methodologies may be limited by a maximum density of encoding sites in the photopolymer.

Virtual HLA Encoding

It is additionally possible to decouple the ISA and HLA planes by encoding for a virtual plane. This may be in consideration of either the HLA or ISA planes, and the below disclosure will focus on a virtual HLA plane and physical ISA encoding procedure for exemplary purposes only.

In previous discussions, it is assumed that an HLA site is encoded for both input and output angles simultaneously, thus forming the requirement of encoding $N^2 \times M^2$ HLA sub-site locations.

Figure 17:
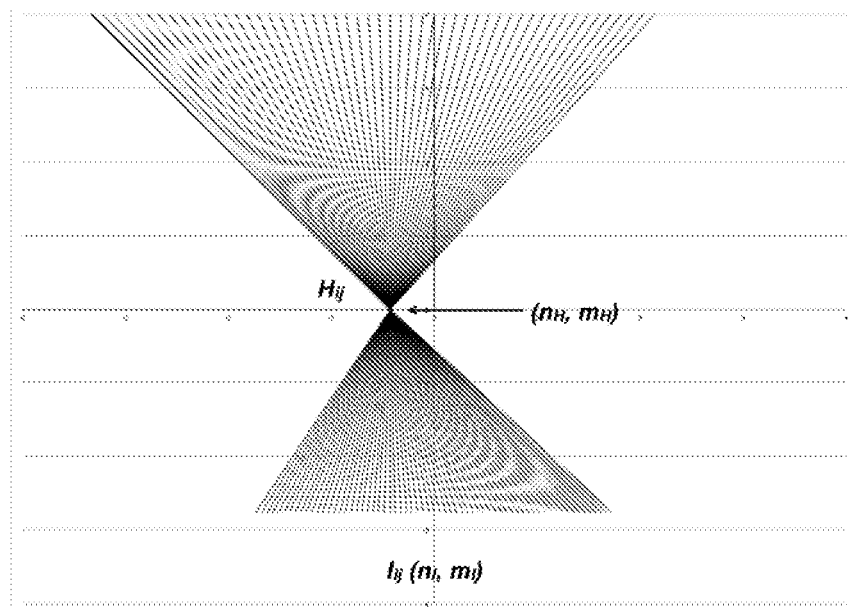
FIG. 17 is an illustration of direct HLA encoding assumptions.

This however assumes that for each $H_{ij}n_Hm_Hn_Im_I$ HLA sub-site location that the input reference rays converge and the output object rays diffract as pairs from the $HI_{ij}n_Hm_Hn_Im_I$ coordinate pair as illustrated in FIG. 17.

This forms all of the required $H_{ij}n_Hm_Hn_Im_I$ input reference and output object angles for each optical element when repeated for all sub-site locations. This is however at the detriment of requiring $N^2 \times M^2$ encoded angles per HLA sub-site, complicating the replication process by requiring multiple reference beam angles. Direct encoding is the most straight-forward method, as this plane is the desired convergence point for the optical element and forms a nearly direct replacement for any such other forms of optics.

Figure 18:
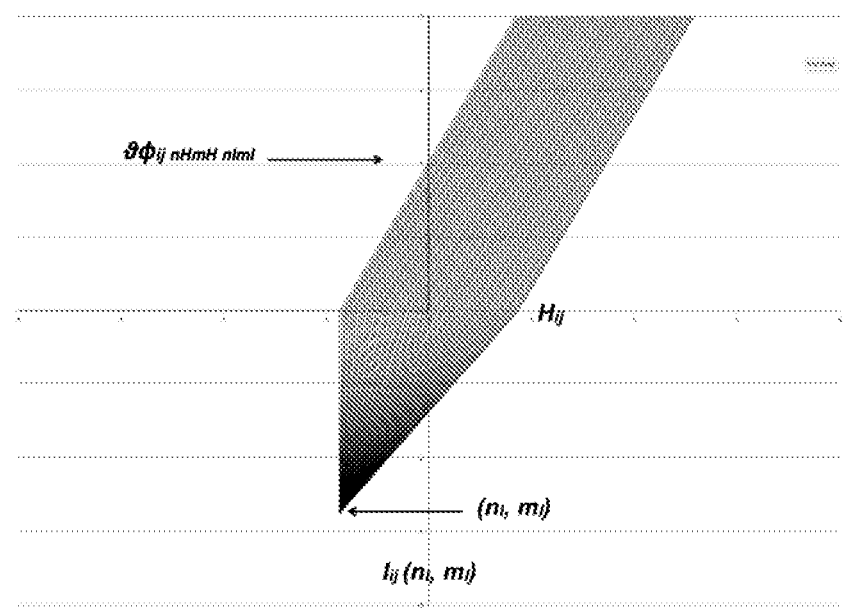
FIG. 18 is an illustration of convergence of rays at the ISA subsite locations.

However, when tracing converging rays from the ISA plane from a given $H_{ij}n_Im_I$ coordinate to the HLA plane, the required input reference angle as defined by the CRA can be viewed as identical parallel rays rather than varied converging and diffracting rays as shown in FIG. 18, which shows that for the same n,m coordinate as illustrated in FIG. 17, but now converged at the ISA plane, the input reference rays as refined are now all viewed as parallel rays at the virtual HLA plane rather than converged and diffracted.

The encoding process may therefore be simplified to allow for a single reference beam angle to encode for the necessary angles as required to converge appropriately at the virtual HLA plane.

Example Encoding Methodology

If one encodes for the destination convergence location at the ISA plane, it is possible to converge rays at the required HLA sub-site location with only a single reference beam orientation and offset optics to form a virtual HLA plane.

It should additionally be noted that each ISA site may exhibit larger $I_{Wijnm}$, $I_{Hijnm}$ sub-site physical dimensions that it's counter-part coordinate location $H_{Wijnm}$, $H_{Hijnm}$ given an OXOY over-scan value of 1,1. Given the example values provided in FIG. 13, each ISA sub-site is approximately 54×81um vs. the HLA sub-site size of 27×40.5 um. With virtual HLA encoding methodologies at the ISA plane, SOTA encoding technologies are close to possible for producing the desired encoding density.

Figure 19:
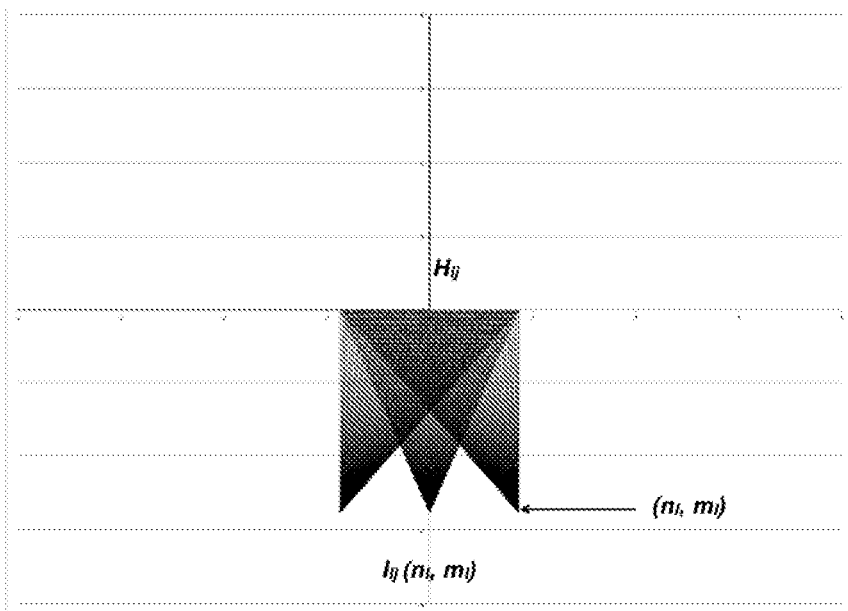
FIG. 19 is an illustration of correct convergence at the virtual HLA element.
Figure 20:
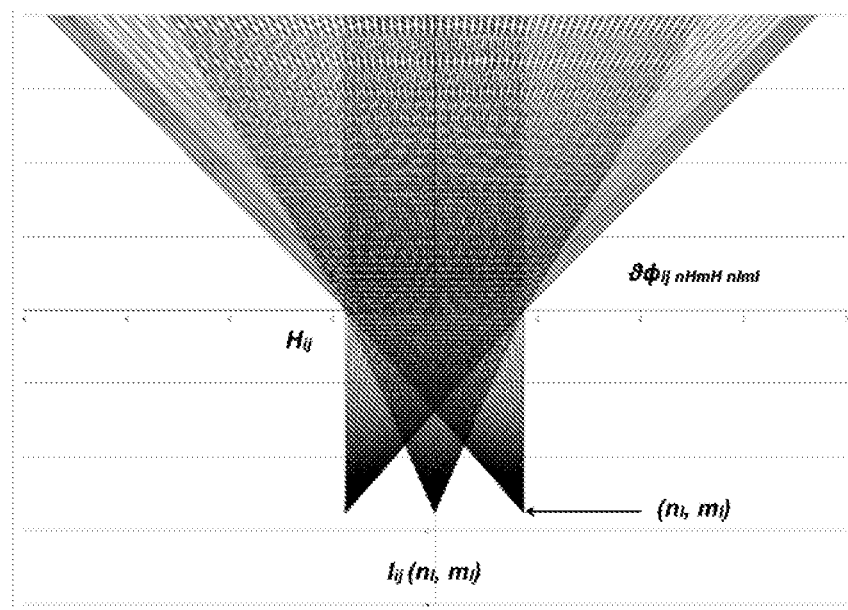
FIG. 20 is an illustration of uncorrected virtual HLA playback.

With this methodology, it is possible to form all of the converged rays at the HLA plane accurately as shown in FIG. 19, however upon playback will no longer diffract to the correct $\vartheta\varphi_{ijn_Hm_H}$ input reference angle as while the rays are accurately converging at the HLA plane, they are unconstrained and no longer diffracting as shown in FIG. 20.

For certain applications, the above uncorrected results highlighted in FIG. 20 may be sufficient and can be compensated with the origination image source to account for the visual distortions that will occur.

Figure 21:
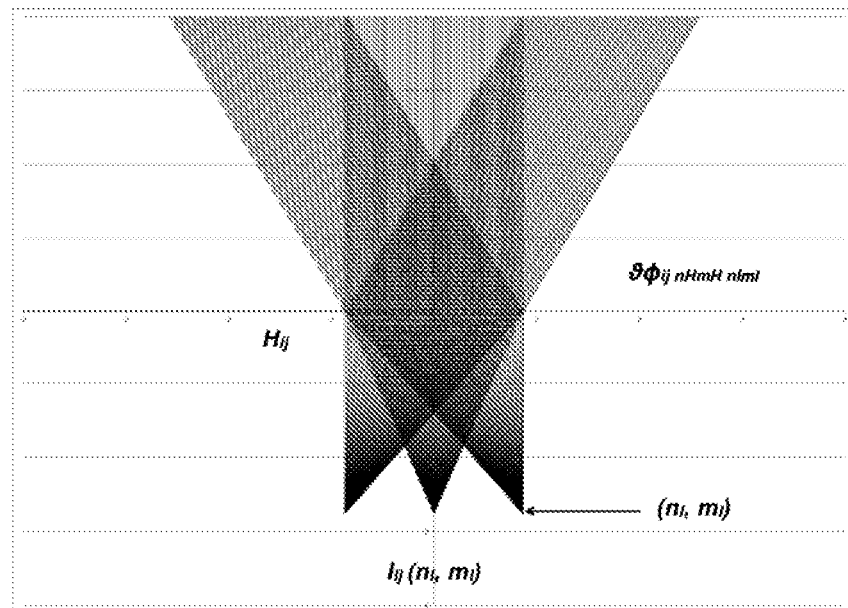
FIG. 21 is an illustration of desired virtual HLA playback.

For most applications however, it is desirable to closely maintain the accurate angles as formed by $HI_{ij}n_Hm_Hn_Im_I$ to ensure appropriate viewed image quality are maintained as shown in FIG. 21.

To accomplish this without up to additional $N^2 \times M^2$ encoded HLA correction angles, it is possible to add an optical element, such as a lens or a relatively simple diffractive optical element ("DOE") that exhibits a plurality of angular variance across the optical surface to more accurately diffract the rays to the desired angles beyond the HLA plane. Fabrication of these DOEs may be produced through a number of different DOE fabrication methodologies known in the art. It is to be appreciated that while embodiments herein may be discussed with reference to a DOE, it is to be appreciated that the present disclosure contemplates embodiments in which the DOE may be replace by other optical elements, such as a lens, to allow for the same optical effect.

With the most simplistic approach, the DOE features a diffractive value that is prescribed for each of the virtual N×M HLA sub-site locations. Each $H_{ij}n_Hm_H$ sub-site location simultaneously corrects all the N×M output object angles from the ISA $I_{ij}$.

For a single $\vartheta\varphi_{ijn_Hm_H}$ correction value for each $H_{ij}n_Hm_H$ sub-site location construct, the $\vartheta\varphi$ diffractive element achieves a nearly uniform CRA($\vartheta\varphi$)$_{n_Im_I}$ input reference angle for all the $n_Im_I$ locations. While this simplistic approach with only a single diffractive value per sub-site location cannot correct each angle as envisioned within the prescribed optical requirements, the accuracy obtained with this approach is significantly increased to a more idealized state.

For a given desired CRA($\vartheta\varphi$)$_{n_Im_I}$ to correct for, the correction applied per sub-site location may be formed by the resultant angle that bisects the angles formed between $\pm(n_Im_I)$ and $n_Hm_H$ from $n_Im_I$ to $-n_I -m_I$ respectively, with corrective optical prescriptions calculated for each virtual $n_Hm_H$ sub-site location as $$\vartheta'_{ijn_Hm_Hn_Im_I} = \frac{\operatorname{atan}\left(\frac{(H_{ijn_Hm_H}x_c - I_{ijn_Im_I}x_c)}{f}\right) + \operatorname{atan}\left(\frac{(H_{ijn_Hm_H}x_c - I_{ij-n_I-m_I}x_c)}{f}\right)}{2}$$

$$\varphi'_{ijn_Hm_Hn_Im_I} = \frac{\operatorname{atan}\left(\frac{(H_{ijn_Hm_H}y_c - I_{ijn_Im_I}y_c)}{f}\right) + \operatorname{atan}\left(\frac{(H_{ijn_Hm_H}y_c - I_{ij-n_I-m_I}y_c)}{f}\right)}{2}$$

where $\vartheta'$, $\varphi'$ represent the corrective angles to be applied to each defined $\vartheta\varphi_{ijn_Hm_Hn_Im_I}$ when calculating for the resultant angle that is produced between the two optical elements and the corrections are applied to each $H_{ij}n_Hm_H$ sub-site and the resultant diffracted angle produced is $\vartheta''$, $\varphi''$ and calculated by $$\vartheta''_{ijn_Hm_Hn_Im_I} = \vartheta_{ijn_Hm_Hn_Im_I} - \vartheta'_{ijn_Hm_Hn_Im_I}$$

$$\varphi''_{ijn_Hm_Hn_Im_I} = \varphi_{ijn_Hm_Hn_Im_I} - \varphi'_{ijn_Hm_Hn_Im_I}$$

For the entirety of this discussion, it is often easier to speak to each $\pm(n_Hm_H)$ location based upon a normalized system wherein $$n''_H = -1 \to 1, \; m''_H = -1 \to 1$$
$$n''_I = -1 \to 1, \; m''_I = -1 \to 1$$
and
$$n''_H = \frac{n'_H - \frac{N}{2}}{N*2}, \; m''_H = \frac{m'_H - \frac{M}{2}}{M*2}$$

$$n''_l = \frac{n'_l - \frac{N}{2}}{N*2}, m''_l = \frac{m'_l - \frac{M}{2}}{M*2}$$

Generally speaking, choosing a DOE correction target that is half way between the max and minimum location across a given $CRA(\vartheta\phi)_{n_l m_l}$ results in the least negative impact of compensation at 0 and maximum angles, whereas a DOE correction at $n''_H=0$, $m''_H=0$ will yield the most accurate results at angles viewed when perpendicular to the optical element surface, but veer further from prescription when $n''_H=\pm 1$, $m''_H=\pm 1$ and vice versa. When $n''_H=\pm 0.5$, $m''_H=\pm 0.5$, the corrections applied are generally most acceptable across the entire $CRA(\vartheta\phi)_{n_l m_l}$ range. This is not always the intended result and will vary depending on the explicit application and any combination of correction factors may be applied as necessary.

To help further articulate these corrections given the certain complexity of this DOE design, given a targeted correction for $n''_H=\pm 0.5$, $m''_H=\pm 0.5$ at a specified single $I_{ij}n_l m_l$ location for all $H_{ij}n'_H m'_H$ from $0 \rightarrow (N-1)$, $0 \rightarrow (M-1)$, the below table helps articulate the uncorrected $\vartheta_{ijn_H m_H n_l m_l}$ angles that would otherwise be produced, the "perfect" lens prescription as envisioned in the above HLA disclosure, the $\vartheta'\phi'_{ijn_H m_H n_l m_l}$ DOE correction factor per $H_{ij}n_H m_H$ sub-site location, and the corrected angle that forms in consideration of the single sub-site corrective element.

Figures 22, 23:
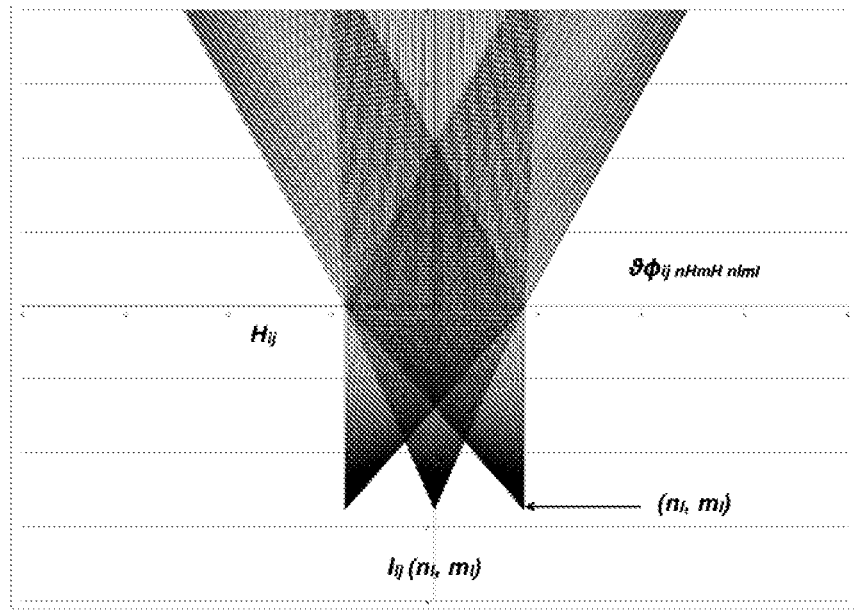
FIG. 22 is an illustration of diffractive optical element ("DOE") corrections.
FIG. 23 is an illustration of DOE-corrected virtual HLA playback.

FIG. 22 is an exemplary table to help demonstrate the uncorrected virtual HLA angles that will form when generating an HOE (e.g., a photographic medium encoded with an interference pattern) for the ISA plane, the angles that are prescribed as the perfect lens, the DOE correction factor that is applied to each sub-site location, and the resultant angles that form when the DOE corrections are applied. It is hopefully clear that although not perfect, these angles are close to the ideal target even when only a single corrective prescription is applied. All above values should be considered exemplary only as every specific application requires different considerations. The values as articulated in FIG. 13 are considered and solved for a target DOE correction of $n''_H=\pm 0.5$ and represents the ISA plane $n'_l=48$ and produces the below matrix of data in FIG. 22

FIG. 23 is a diagram showing the corrected virtual HLA playback with the DOE correction element at the virtual HLA plane. With only a single DOE corrective optical value for each n,m virtual HLA sub-site location, it is possible to nearly correct the virtual HLA to the accurate angles prescribed by $HI_{ij}n_H m_H n_l m_l$. The rays forming corrected $\vartheta\phi$ demonstrate the significantly increased accuracy to form parallel rays as defined by the system's CRAD $\vartheta\phi$ when compared to the uncorrected virtual HLA rays illustrated in FIG. 20 and very close to the system's optical prescription illustrated in FIG. 21.

In an embodiment, the correction shown in FIG. 23 may be implemented with an interference pattern encoded to direct light similar to the ISA discussed with reference to FIGS. 8-12 and an optical element configured to direct light similar to the HLA discussed with reference to FIGS. 8-12. In an embodiment, the interference pattern may define an array of substrate sites in a substrate similar to the ISA sites discussed with reference to FIGS. 1-12, each substrate site comprising a plurality of substrate subsites (similar to the ISA subsites). The optical element may define an array of optical element sites similar to the HLA sites as discussed with reference to FIGS. 1-12, each corresponding to a respective substrate site, each optical element site comprising a plurality of optical element subsite locations (similar to the HLA subsite locations). The optical element and the interference pattern are configured that each set of light propagation paths that extend through a same optical element site and a same substrate subsite of a corresponding substrate site extend from the optical element away from substrate in substantially a unique direction and converge from different optical element subsite locations of the same optical element site to the same substrate subsite of the corresponding substrate site, the unique direction being determined by an angular direction of a chief ray propagation path in each set of light propagation paths.

Figure 24:
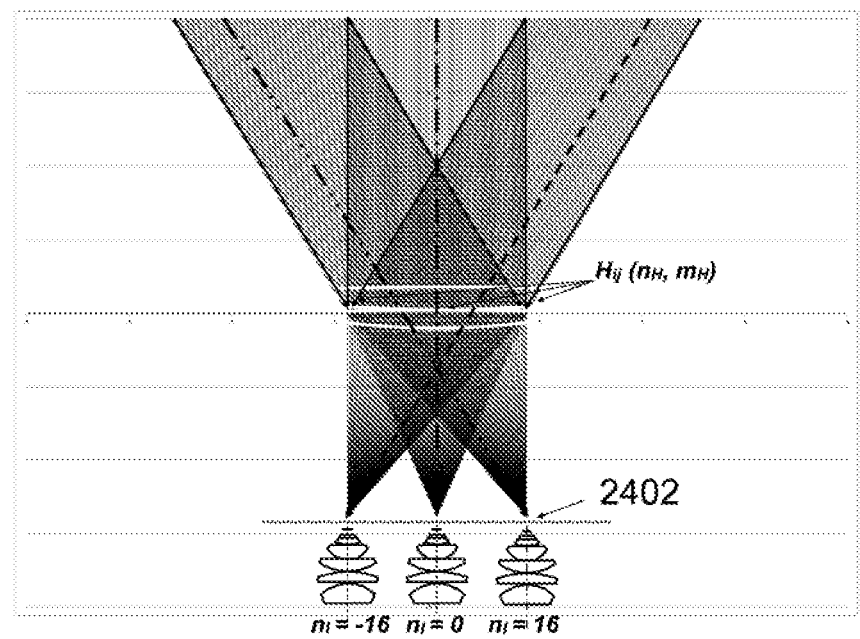
FIG. 24 is an illustration of encoding at the virtual HLA plane.

FIG. 24 is an illustration of an embodiment of encoding approach for the ISA site 2402 where $n_l$ sub-site locations of the ISA site 2402 are encoded with a reference beam from underneath and the object beam angling collimated rays based upon the desired CRA angles as defined by the ISA sub-site location. The reference optics may or may not exhibit an angle and may or may not include offset encoding rays.

As discussed previously, it is to be appreciated that while illustrations of the present disclosure, such as FIGS. 23 and 24, may illustrate the object beams from below, or the opposite side of the reference beam, thus representing a reflection hologram or the like, one of ordinary skilled in the art would readily appreciate that the illustrations provided herein are intended only to demonstrate the principles of the present disclosure and is not intended to be limiting. Based on the principles disclosed or demonstrated in the present disclosure, it should be readily apparent to one of ordinary skill in the art that embodiments in the present disclosure need not have the explicit orientation illustrated, and encoding methodologies of the present disclosure may be implemented using the same/similar sides, edges, off-axis embodiments providing for transmission, volume, edge lit, gratings, diffraction, refraction, and the like.

With this encoding methodology, the mechanical and optical process is far more simplified wherein the object beam (now above the HLA plane) only relies on an element to focus and converge rays accurately at the desired ISA plane based upon the CRA and with parallel rays that can fill the entrance pupil of the optical element in order to produce the required angles as prescribed. The optics do not necessarily need to move, but rather, the collimated beam may be oriented accurately to account for the CRA required angle. The reference beam optics (now below the ISA plane) are far more simplified and do not necessarily need to be angled in any specific way as these locations now represent the illumination plane which is a diffuse illumination surface. These beams may be offset, perpendicular and/or angled depending on the specifics of the encoding system.

Figure 25:
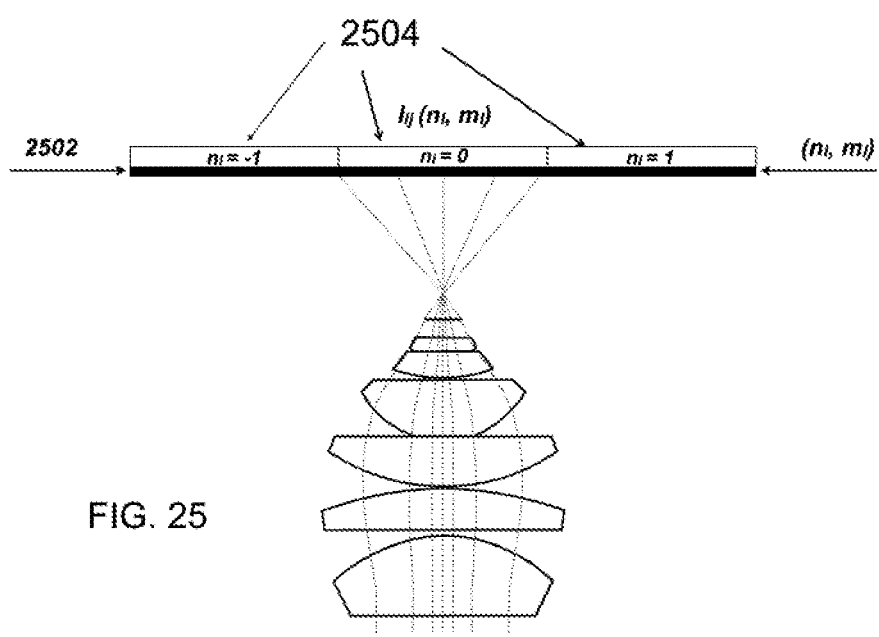
FIG. 25 is an illustration of ISA reference beam encoding.

To account for the illumination surface for playback, it is possible to generate a set of diverging rays that mimic the behavior of a specified light source. In one embodiment, the encoding reference optics (or object beams for all previous disclosures) may intentionally produce a range of angles as rays pass through the focus of a converging optical assembly and generate a range of illumination angles confined to the holographic optical element sub-site $H_{Wijnm}$, $I_{Hijnm}$ as depicted FIG. 25. As discussed elsewhere in the present disclosure, the holographic optical element may include a substrate comprising a photographic medium encoded with an interference pattern, and in the embodiment of FIG. 25, the encoded interference pattern includes a substrate site 2502 with subsites 2504.

Figure 26:
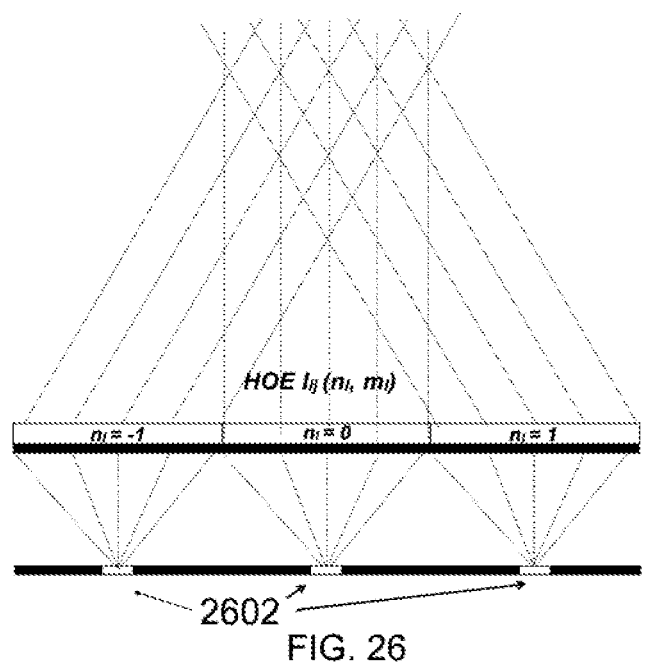
FIG. 26 is an illustration of ISA illumination source reconstruction.

Upon display of a given illumination source 2602, the encoded angles will now accurately reconstruct the encoded object beam without the necessity of a laser illumination source as illustrated in FIG. 26.

Other optical configurations are included depending on the profile of the illumination pixel and may include multiple smaller elements, differing focal lengths, aperture, offset, and/or a variety of other optical reconfiguration in order to accurately reduce the requirement for collimated rays for appropriate use of the HOE element.

Additionally, other DOE elements may be leveraged at the illumination source in order to more accurately produce near collimated rays from a non-coherent/non-collimated illumination source. For example, micro-Fresnel or kinoform elements may be leveraged.

It is possible to divide each DOE sub-site location into $d_x$, $d_y$ subdivisions. This serves to modify the above DOE corrective math with an additional function based upon the $n_H m_H$ coordinate and/or add additional DOE optical elements before or after the virtual HLA plane in order to further increase the accuracy to more closely match the original optical prescription.

Assuming a virtual HLA spot size that is smaller than the HLA sub-site itself, it is additionally possible to leverage the $d_x$, $d_y$ subdivision corrective methodology with a single DOE element that is offset below or above the virtual HLA plane. With this offset, it is possible to diffract rays of light that have not yet converged (below) or are just beyond convergence (above) at the desired HLA plane, and produces rays that are now distributed across a larger distribution of space within the $H_{ij} n_H m_H$ sub-site location and provide additional control with the encoded $d_x$, $d_y$ subdivisions with only a single or multi-element DOE plane(s).

Figure 27:
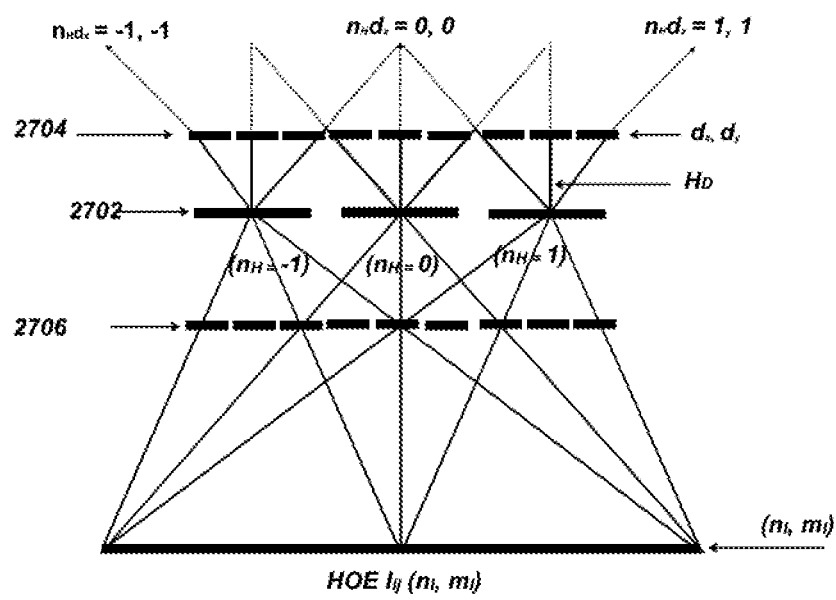
FIG. 27 is an illustration of an embodiment of DOE sites.

The most straight forward approach is to place the HOE above the virtual HLA plane to account for the potential diffraction error, where the resultant subdivisions may be expressed as $$HI_{ij} n_H m_H d_x d_y$$

where each $d_x$, $d_y$ coordinate represents the local coordinate system for each nH, mH sub-site, resulting in an offset location that is approximately the position where converging rays from the virtual HLA plane just begin to intersect adjacent sub-site rays as depicted in FIG. 27. FIG. 27 shows exemplary multi-element DOE correction elements with a first element 2702 and a second element 2704 placed at distance HD demonstrating Ox, Oy second element DOE subdivisions co-located at the distance where each $n_H$ rays converge between adjacent sub-site locations. An alternative location 2706 of the second element DOE is also shown.

Leveraging similar considerations as performed with a single DOE corrective prescription, the same logic may apply to the above depicted multi-element design wherein additional corrections may be refined through the addition of the $d_x$, $d_y$ sub-site locations.

Other corrective opportunities include holographically encoding each virtual $H_{ij} n_H m_H$ sub-site location into subdivided exit angles based upon the latest SOTA angular multiplexing methodologies. In this fashion, it is possible to alter the corrective application based on entrance angle (as defined from the ISA plane to the DOE element) and a varying correction is applied based upon angle of entry. This may be performed as a single element, in conjunction with a DOE element, or as a varied multi-element optical design.

ISA>HLA Region Considerations

Figure 28:
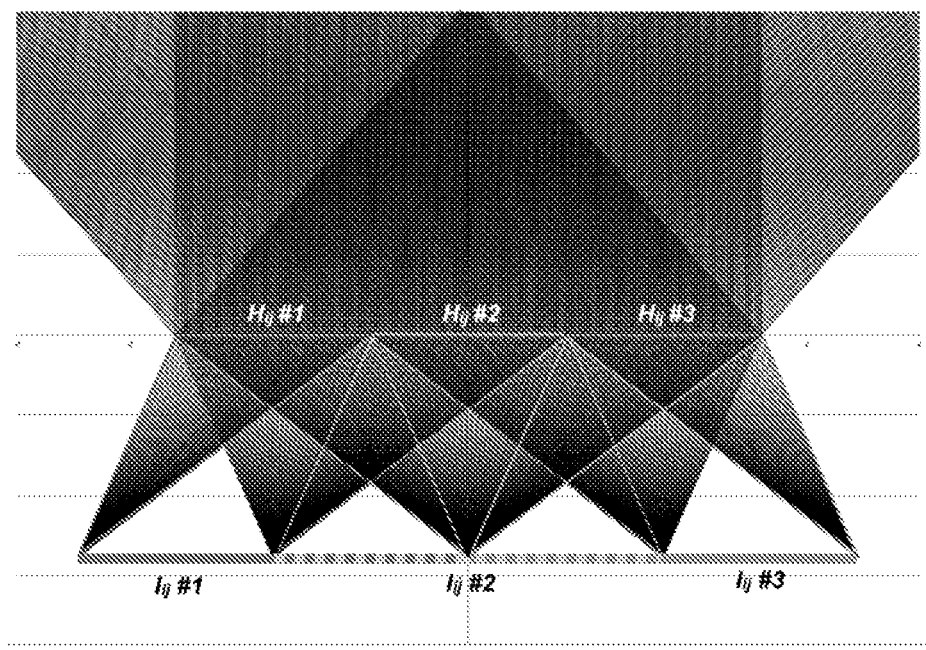
FIG. 28 is an illustration of encoding consideration for large ISA sites.

It should additionally be noted that the complexity of encoding the ISA HOE is more complex when encoding for ISA regions that are larger than the HLA region. In this case, some illumination plane sub-sites will be contributing to more than one HLA at the same time. For example, if the ISA overlap factor is nonzero in only one axis (for example, OX=1 and OY=0), then each ISA source will contribute to two different HLA elements. To be more specific for this example, for any one HLA site $H_{ij}$, simultaneous ISA $I_{ij}$ encoding must occur where 1) all the sub-sites have outputs contributing to $H_{ij}$, 2) the negative $n_I$ sub-sites are contributing to the neighbor in the negative X direction, and 3) the positive the positive $n_I$ sub-sites are contributing to the neighbor in the positive X direction. The encoding process for this example arrangement will require three different coherent light and lens sources. The diagram in FIG. 28 demonstrates three plane HLA lenses with an Ox=1 overscan consideration.

There are many ways to accommodate this element, with the most straightforward being the multiplication of the lenses as depicted in FIGS. 14-16, to account for the number of HLA lenses that are contributing to the final ISA sub-site encoded region. This additionally requires multiple beams to be split into different optical regions in order to accommodate the required CRA for each lens throughout the encoding process for each n,m sub-site respectively.

Similarly, up to nine separate lenses may be required simultaneously when encoding these over-scan regions when there is overlap in both dimensions ($O_x$=1 and $O_y$=1), since each sub-site may contribute to nine real or virtual HLA sub-site locations.

Diffractive Elements Only Optical System Design

While there are certain advantages to encoding HOEs, it is possible to design the prescribed optical system design with single or multi-element array of diffractive optics.

Figure 29:
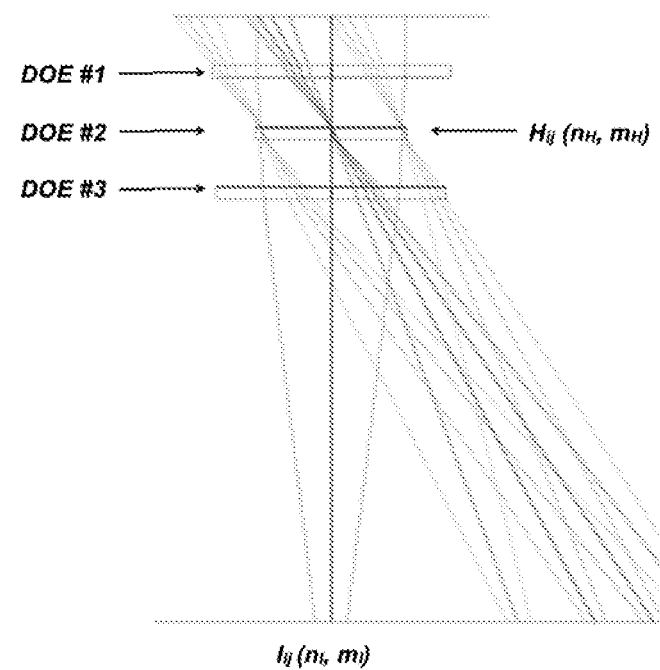
FIG. 29 is an illustration of multi element DOE HLA optical system.

Diffractive optical elements (DOE's) allow for the advantage of leveraging fabrication methodologies that are well established and refined. These elements, for example the multi-level phased zone plate (PZP), can be fabricated in thin sheets with a thickness less than 1 mm, and multiple planes of such elements may be used to create a lensing function. The illustration in FIG. 29 illustrates a ray trace of one such design that includes three diffractive optical elements with unique diffractive properties for each element and for each sub-site location respectively.

The DOE system may additionally be fabricated with a virtual HLA in mind, or with diffractive optics at the ISA plane.

DOE elements generally suffer from decreased overall imaging quality given the large negative chromatic aberration that they introduce. This can be addressed by instead using a hybrid between a refractive and a diffractive element to achieve a lens function. A simple refractive lens can be attached to a thin DOE element in such a way that the large negative chromatic aberration of the DOE is compensated by the positive chromatic aberration of the lens. Such a hybrid combination can reduce distortions and produce a more uniform point spread function (PSV) across the entire image plane, improving off-axis performance for a single simple lens.

Additional considerations:

Other options have been considered to reduce required HOE resolution requirements including:

Multiplexing each sub-site to form a pattern of differing encoded wavelengths similar to a bayer pattern;

Layer multiple HOEs together to form a more complex optical system from larger overall holopixels; and Simply abandon temporarily the concept of replicating the properties of the lens aperture and provide each illumination pixel with an independent input reference and output object angle at the detriment of significantly decreased viewable illumination.

Given the limitations of the photopolymers, and in order to limit the transmission loss, what would be ideal is to further divide each sub-site into an additional series of N×M sub-sites (or some value greater or less than depending on which variables have been multiplexed or removed), each exhibiting a single, series, and/or multiplexed RGB characteristics.

In the most simplistic form that sub divides every sub-site into N×M "sub-sub-sites," each with only a single input reference and output object angle encoded respectively (at the detriment of lower viewable transmission as each sub-site would only now exhibit 1/(N×M) of the previously envisioned total illumination) and with only a single color encoded (with a repeating pattern for RGB respectively with a $\frac{1}{3}^{rd}$ loss of angular encoding resolution per sub-site, or some other similar pattern, or alternatively, multiplexed for RGB), each resulting sub-sub-encoding site is now approximately (27.4 um/60×41.1 um/40) 0.456 um×1.0275 um.

Alternatives:

Given the input reference angles should ideally be a single beam (vs. N×M), and that a single reference beam may produce complex output angles, it is possible to directly encode the ISA plane vs. the HLA plate to form a Virtual HOE plane.

Additional considerations can be included if this methodology is more plausible in some embodiments.
1. With a similar process as suggested above, rather than encoding the input reference directly, we encode the ISA coordinate directly.
2. Although the illumination source is not natively collimated, with a simple diffractive element (e.g. kinoform or similar), and/or pinhole mask array, and/or placing the HOE directly on the ISA surface as close to the illumination plane as possible with appropriate refractive matching adhesives and/or materials, it is possible to produce a near collimated illumination source per ISA site. This may also be explored for all of the above discussions.
3. Now, the input reference beam is from a single angle (ideally perpendicular to the normal of the HOE surface, or another direction as compensated for by the diffractive optical element), and the object beam leverages a series of optical elements to expand and focus the beam to the same ISA coordinate as the reference beam.
4. The object beam is formed to match:
    a. The HLA optical element w×h size at virtual f distance from ISA encoding site
    b. Angled appropriately such that the CRA passes through the ray that intersects both the virtual HLA center and ISA encoded coordinate respectively
    c. Has the appropriate aperture and focal length in aggregate considered such that the rays of light that converge at the ISA appropriately match the above provided diagrams.
    d. When viewed as a reflection (or other) hologram.

Note: The ISA w×h may now need to be matched to the HLA, or the HLA will potentially be (much) larger in the virtual coordinate system. This may not be an issue and the specified ISA overlapping regions may be possible with multiple encoded angles that may be offset by some amount, or >10°.

Or alternatively, each ISA sub-site is encoded with partial coverage from each exposure by masking portion of the object beam, such that only a "pie-shaped" segment from the complete beam is focused at the HOE, and provides some fraction of the total lens. In the current embodiment, there is a 200% overlap between HLA and ISA respectively, resulting in up to four shared HLAs per ISA coordinate. This would result in exposing the interference pattern in quarters to maintain this relationship and should be possible with this approach, or some combination of segments and multiplexing.

Now that all of the rays pass through the HLA coordinate system (when viewed as a transmission/volume or similar replicated hologram), the challenge may be that the rays are no longer collimated as originally envisioned with the encoding schema from the reference beam and the associated diffracted object beam, the rays emanating from the illumination source will pass through the virtual HLA plane and continue to move through space without any further angular change as required to view each HLA sub-site appropriately. Depending on the ideal viewing distance and sub-site FOV, this may or may not be a large issue (currently assumed to be a detriment to viewable image quality).

However, the addition of a second (or more) HOE at or near the location of the virtual HLA plane has the ability to encode the corrective action for the rays that pass through each of these virtual HLA sub-site coordinates.

Each coordinate at the virtual HLA now has a converging contribution of rays from all ISA sub-sites. The addition of a diffractive element (e.g. kinoform, grating, Fresnel array, etc.) can now be designed to correct the CRA from each of the HLA sub sites wherein the center ray from the collection of ISA ray bundles can be calculated and corrected to meet the desired HLA specifications.

In this fashion, it is additionally possible to create a simple digital holo pixel to perform this correction with the same method articulated above wherein the CRA from the object beam (which is now reversed in location from the previous reference beam) is formed to match the required correction factor to diffract the incorrectly diverging rays to the correct orientation by altering the focal length, aperture, position and rotation according to the most idealized configuration given the reference beam.

Other approaches contemplated in the present disclosure:

Encode the master HOE as an edge lit hologram and include this illumination source throughout replication as an element in the final display Convert the master from reflection/volume/transmission to a transmission/reflection/volume hologram by offsetting the replication plane from the HLA location (or the original placed location depending on the configuration implemented) to the ISA plane (or an alternative plane) to allow for conversion between master and the various replicas Convert the master or replica from a reflection/volume/transmission hologram to a reflection or transmission edge lit hologram to provide the ability to view the encoded optical properties with a laser illumination source that has been optimized and controlled based upon the encoding process to provide a higher quality HOE without the use of white light.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention (s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A waveguide comprising:
   a substrate comprising a photographic medium; and
   an interference pattern encoded in the photographic medium, the interference pattern defining an array of substrate sites in the substrate;
   wherein the interference pattern is configured to propagate light along light propagation paths extending from light locations on a first side of the substrate toward a second side of the substrate;
   wherein the light propagation paths comprise sets of light propagation paths that extend through a same substrate site and a same light location, wherein each set of light propagation paths are configured to extend in substantially a unique direction on the second side of the substrate and converge from the same substrate site to the same light location on the first side of the substrate, the unique direction being determined by an angular direction of a chief ray propagation path in each set of light propagation paths; and
   whereby, the array of substrate sites is configured to propagate light according to a four-dimensional light field coordinate system comprising spatial coordinates defined by positions of the substrate sites and angular coordinates defined by the unique directions of the sets of light propagation paths for each substrate site.

2. The waveguide of claim 1, wherein the photographic medium comprises at least one of the materials selected from the group consisting of photographic emulsions, dichromated gelatin, photoresists, photothermoplastics, photopolymer, and photorefractives.

3. The waveguide of claim 1, wherein the interference pattern comprises holograms encoded to direct light as an array of lenslets, thereby forming a holographic lenslet array ("HLA"), and wherein the holograms comprise at least one of reflective holograms and transmissive holograms.

4. The waveguide of claim 3, wherein the HLA comprises a plane subdivided into sites, and the substrate sites correspond to the sites of the HLA, and wherein the sites of the HLA are each configured to direct light as a lenslet.

5. A holographic energy directing system, the system comprising the waveguide of claim 1 and an illumination source array ("ISA") configured to provide illumination at the light locations on the first side of the substrate.

6. The holographic energy directing system of claim 5, wherein the ISA comprises a plurality of light sources at the light locations on the first side of the substrate.

7. The holographic energy directing system of claim 5, wherein the ISA defines a plane subdivided into sites, and the sites of the ISA each correspond to at least one respective site of the HLA and each comprise a plurality of ISA subsite locations corresponding to the light locations on the first side of the substrate.

8. The holographic energy directing system of claim 7, wherein the corresponding sites of the HLA and the ISA at least partially overlap, or have different dimensions, or are co-centered.

9. The holographic energy directing system of claim 7, wherein the chief ray propagation path comprises the light propagation path between one of the ISA subsite locations and a center of the corresponding respective site of the HLA, and wherein the unique direction of each set of light propagation paths is determined by a chief ray angle ("CRA") of the respective chief ray propagation path.

10. The holographic energy directing system of claim 9, wherein, for each ISA subsite location of a first site of the ISA, a corresponding site of the HLA in the interference pattern is encoded with a common input reference beam angle determined by the CRA of the respective chief ray propagation path for each ISA subsite location.

11. The holographic energy directing system of claim 9, wherein, for each ISA subsite location of a first site of the ISA, a corresponding site of the HLA in the interference pattern is encoded with output object beam angles determined by light propagation paths converging from HLA subsite locations in the corresponding site of the HLA to each ISA subsite location of the first site of the ISA.

12. The holographic energy directing system of claim 9, wherein, for each ISA subsite location of a first site of the ISA, a corresponding site of the HLA in the interference pattern is encoded with a common input reference beam angle determined by the CRA of the respective chief ray propagation path for each ISA subsite location and with output object beam angles determined by light propagation paths converging from HLA subsite locations in the corresponding site of the HLA to each ISA subsite location of the first site of the ISA.

13. The holographic energy directing system of claim 12, wherein, for the first site of the ISA and the corresponding site of the HLA, one of the respective HLA subsite locations is encoded at one time with the common input reference beam angle for a single respective ISA subsite location and one of the output object beam angles for the single respective ISA subsite location.

14. The holographic energy directing system of claim 12, wherein, for the first site of the ISA and the corresponding site of the HLA, a plurality of the respective HLA subsite locations are encoded at the same time with the common input reference beam angle for a single respective ISA subsite location and the respective plurality of the output object beam angles for the single respective ISA subsite location.

15. The holographic energy directing system of claim 12, wherein, for the first site of the ISA and the corresponding site of the HLA, one of the respective HLA subsite locations is encoded at one time with a plurality of common input reference beam angles for a respective plurality of ISA subsite locations and the respective plurality of the output object beam angles for the respective plurality of ISA subsite locations.

16. An array of waveguides comprising:
a substrate comprising a photographic medium;
an interference pattern encoded in the photographic medium, the interference pattern defining an array of substrate sites in the substrate, each substrate site comprising a plurality of substrate subsites; and
an optical element, the optical element defining an array of optical element sites each corresponding to a respective substrate site, each optical element site comprising a plurality of optical element subsite locations;
wherein the interference pattern is configured to propagate light along light propagation paths extending through the substrate subsites of each substrate site to the optical element subsite locations of the respective optical element site, wherein the light propagation paths comprise sets of light propagation paths that extend through a same optical element site and a same substrate subsite of a corresponding substrate site;
wherein each set of light propagation paths extend from the optical element away from substrate in substantially a unique direction and converge from different optical element subsite locations of the same optical element site to the same substrate subsite of the corresponding substrate site, the unique direction being determined by an angular direction of a chief ray propagation path in each set of light propagation paths; and
whereby, the array of optical element sites is configured to propagate light according to a four-dimensional light field coordinate system comprising spatial coordinates defined by positions of the optical sites and angular coordinates defined by the unique directions of the sets of light propagation paths for each optical site.

17. The array of waveguides of claim 16, wherein the photographic medium comprises at least one of the materials selected from the group consisting of photographic emulsions, dichromated gelatin, photoresists, photothermoplastics, photopolymer, and photorefractives.

18. The array of waveguides of claim 16, wherein the optical element comprises at least one of an array of lenslets and an array of diffractive optical elements located at the optical element sites.

19. The array of waveguides of claim of 24, wherein each diffractive optical element propagates light according to the function of a lens.

20. The array of waveguides of claim of 24, wherein each diffractive optical element is subdivided into an array of subsite locations, where each subsite location functions to deflect light propagation paths therethrough by a deflection angle, and wherein the deflection angle at each subsite is chosen to deflect light for each set of propagation paths incident on the first side of the optical site into a substantially unique direction, for all the sets of propagation paths associated with the diffractive optical element.

21. The array of waveguides of claim 16, wherein the interference patterns comprise at least one of reflective holograms and transmissive holograms.

22. A holographic energy directing system, the system comprising the array of waveguides of claim 16 and an illumination source array ("ISA") configured to provide illumination at each substrate site.

23. The holographic energy directing system of claim 22, wherein the ISA comprises a plurality of illumination light sources proximate to the substrate sites, wherein each interference pattern substrate site is encoded to direct a distribution of incident light from the corresponding light source along the respective sets of light propagation paths, and wherein the optical sites and the corresponding substrate sites at least partially overlap, or have different dimensions, or are co-centered.

\* \* \* \* \*